(12) United States Patent
Yao et al.

(10) Patent No.: US 11,865,787 B2
(45) Date of Patent: Jan. 9, 2024

(54) METHOD AND SYSTEM FOR ADDITIVE MANUFACTURING

(71) Applicants: Agency for Science, Technology and Research, Singapore (SG); Nanyang Technological University, Singapore (SG)

(72) Inventors: Xiling Yao, Singapore (SG); Youxiang Chew, Singapore (SG); Guijun Bi, Singapore (SG); Seung Ki Moon, Singapore (SG)

(73) Assignees: Agency for Science, Technology and Research, Singapore (SG); Nanyang Technological University, Singapore (SG)

( * ) Notice: Subject to any disclaimer, the term of this patent is extended or adjusted under 35 U.S.C. 154(b) by 760 days.

(21) Appl. No.: 16/968,318

(22) PCT Filed: Feb. 14, 2019

(86) PCT No.: PCT/SG2019/050088
§ 371 (c)(1),
(2) Date: Aug. 7, 2020

(87) PCT Pub. No.: WO2019/160507
PCT Pub. Date: Aug. 22, 2019

(65) Prior Publication Data
US 2021/0107231 A1    Apr. 15, 2021

(30) Foreign Application Priority Data
Feb. 19, 2018  (SG) ............................ 10201801323Y

(51) Int. Cl.
*B29C 64/393* (2017.01)
*B33Y 50/02* (2015.01)
*G06T 17/20* (2006.01)

(52) U.S. Cl.
CPC ............ *B29C 64/393* (2017.08); *B33Y 50/02* (2014.12); *G06T 17/20* (2013.01)

(58) Field of Classification Search
CPC ....... B29C 64/00; B29C 64/393; B29C 67/00; B33Y 50/02; B33Y 10/00; B33Y 30/00; G06T 17/20
See application file for complete search history.

(56) References Cited

U.S. PATENT DOCUMENTS 5,854,748 A * 12/1998 Snead ................... B29C 64/124
345/419
2004/0222549 A1    11/2004 Sano et al.
(Continued)

FOREIGN PATENT DOCUMENTS

CN    103777911 A    5/2014
CN    104331933 A    2/2015
(Continued)

OTHER PUBLICATIONS

Bharat Ramachandra Beltur, Adaptive Slicing in Additive Manufacturing using Strip Tree Data Structures, Oct. 18, 2016, University of Cincinnati, pp. 1-78, see p. 18-24, (section 2.3, slicing of an STL file) (Year: 2016).*

(Continued)

*Primary Examiner* — Kidest Bahta
(74) *Attorney, Agent, or Firm* — Shackelford, Bowen, McKinley & Norton, LLP

(57) ABSTRACT

There is provided a method of additive manufacturing using at least one processor, the method includes: determining a first slicing layer of a three-dimensional (3D) model of a 3D object; determining a second slicing layer of the 3D model
(Continued)

based on the first slicing layer, the second slicing layer being immediately subsequent to the first slicing layer; and determining a thickness of the second slicing layer and an orientation for a third slicing layer of the 3D model based on a difference between the second slicing layer and the first slicing layer, the third slicing layer being immediately subsequent to the second slicing layer. There is also provided a corresponding system and computer program product for additive manufacturing.

20 Claims, 15 Drawing Sheets

(56) References Cited

U.S. PATENT DOCUMENTS

| | | | |
|---|---|---|---|
| 2006/0155418 A1 | 7/2006 | Bradbury et al. | |
| 2015/0154321 A1* | 6/2015 | Schmidt | B29C 64/40 700/98 |
| 2015/0269282 A1* | 9/2015 | Nelaturi | G06F 30/00 700/98 |
| 2016/0086376 A1 | 3/2016 | Tang et al. | |
| 2016/0176117 A1* | 6/2016 | Lee | G05B 19/4099 700/98 |
| 2017/0176979 A1 | 6/2017 | Lalish et al. | |
| 2017/0297264 A1 | 10/2017 | Linnell et al. | |

FOREIGN PATENT DOCUMENTS

| | | |
|---|---|---|
| CN | 104503711 A | 4/2015 |
| CN | 104708824 A | 6/2015 |
| CN | 105904729 A | 8/2016 |
| CN | 106898050 A | 6/2017 |

OTHER PUBLICATIONS

Mao et al., Adaptive slicing based on efficient profile analysis ,Feb. 2019, Computer-Aided Design, vol. 107, Feb. 2019, pp. 89-101. (Year: 2019).*

Divya Kanakanala, "Multi Axis Slicing for Rapid Prototyping," Master Thesis, Missouri University of Science and Technology, Summer 2010, pp. 1-47.

Wang et al., "Adaptive Slicing for Multi-axis Hybrid Plasma Deposition and Milling," Proceedings of the 2014 Annual International Solid Freeform Fabrication Symposium, 2014, pp. 1277-1287.

Oh et al., "Efficient Point-Projection to Freeform Curves and Surfaces," Computer Aided Geometric Design, vol. 29, No. 5, 2012, pp. 242-254.

International Search Report for International Application No. PCT/SG2019/050088 dated Apr. 12, 2019, pp. 1-5.

Written Opinion of the International Searching Authority for International Application No. PCT/SG2019/050088 dated Apr. 12, 2019, pp. 1-5.

Office Action for Chinese Patent Application No. 2019800142963 dated Nov. 30, 2021, pp. 1-12.

* cited by examiner

METHOD AND SYSTEM FOR ADDITIVE MANUFACTURING

CROSS-REFERENCE TO RELATED APPLICATION

This application claims the benefit of priority of Singapore Patent Application No. 10201801323Y, filed 19 Feb. 2018, the content of which being hereby incorporated by reference in its entirety for all purposes.

TECHNICAL FIELD

The present invention generally relates to a method and a system for additive manufacturing, and more particularly, for slicing a three-dimensional (3D) model of a 3D object for additive manufacturing (or 3D printing).

BACKGROUND

A three-dimensional (3D) model (e.g., 3D mesh model) is a digital representation of a 3D object (e.g., 3D part) in computer-aided design (CAD) and computer-aided manufacturing (CAM). For example, the .STL model comprising connected triangular faces is a common 3D mesh format for the 3D model in additive manufacturing. Printing paths can be obtained by slicing the 3D model into multiple layers having two-dimensional (2D) cross-sectional shapes (which may also be referred to as slicing layers or slices).

In existing additive manufacturing processes (e.g., powder-bed fusion, binder jetting, vat photopolymerization and so on), a common conventional slicing method is uniform horizontal slicing with constant layer thickness. In such a conventional method, all slicing planes are parallel to the horizontal datum surface (denoted as the X-Y plane) of the build platform, and the distance between any two adjacent or neighboring slicing planes is a predetermined constant value representing the layer thickness during the additive manufacturing process. Due to the staircase effect, additive manufactured objects (e.g., parts) using the conventional uniform horizontal slicing method have poor dimensional accuracy and surface finish, especially at places or regions with large local curvatures or steep slopes.

Another type of conventional slicing method is adaptive horizontal slicing, which was developed to improve the surface quality of additive manufactured objects (e.g., parts). Same as in the above-mentioned conventional uniform horizontal slicing method, all slicing planes in adaptive horizontal slicing are parallel to the X-Y plane. However, the layer thickness between adjacent slices is not constant, but may vary along the Z direction (vertical or longitudinal axis) of the object. Although various conventional adaptive horizontal slicing techniques have been disclosed, the common approach is to reduce the layer thickness at special "regions-of-interests" (e.g., surfaces with steep slopes, large curvatures, turning points and so on) in order to reduce the staircase effect at such regions.

A further type of conventional slicing method is directional slicing. In such a conventional method, slicing planes may not be parallel to each other. The slicing plane orientations are set to align with the object's axial or "skeleton" direction. For example, various conventional directional slicing methods identify the intersection region(s) of two adjacent slices projected onto a reference plane (e.g. the X-Y plane), and then calculate the relative shift of slicing direction based on the position and size of the intersection region(s).

However, conventional 3D slicing methods have various limitations or deficiencies when used in additive manufacturing processes that affect the quality of the resultant 3D object printed (i.e., the additive manufactured object). For example, the conventional uniform horizontal slicing method fails to adapt slice thickness and slicing plane orientation along the object's axial direction; the conventional adaptive horizontal slicing method fails to adapt the slicing plane orientation along the object's axial direction; and the conventional directional slicing method requires adjacent slices to intersect in order to calculate the change of slicing plane orientation and fails to adapt slice thickness along the object's axial direction, all contributing to poorer quality (e.g., dimensional accuracy and surface finish) of the resultant 3D object printed (e.g. especially at places or regions with large local curvatures or steep slopes). Furthermore, in relation to the print head trajectory, conventional methods fail to adapt to local curvatures of inclination angle of the object's surface, which further contributes to poorer quality of the resultant 3D objected printed.

A need therefore exists to provide a method and a system for additive manufacturing that seek to overcome, or at least ameliorate, one or more of the deficiencies associated with conventional methods and systems for additive manufacturing, such as to improve the quality (e.g., surface quality) of the resultant 3D object printed (i.e., the additive manufactured object). It is against this background that the present invention has been developed.

SUMMARY

According to a first aspect of the present invention, there is provided a method of additive manufacturing using at least one processor, the method comprising:
  determining a first slicing layer of a three-dimensional (3D) model of a 3D object;
  determining a second slicing layer of the 3D model based on the first slicing layer, the second slicing layer being immediately subsequent to the first slicing layer; and
  determining a thickness of the second slicing layer and an orientation for a third slicing layer of the 3D model based on a difference between the second slicing layer and the first slicing layer, the third slicing layer being immediately subsequent to the second slicing layer.

In various embodiments, the difference is based on an area of the second slicing layer and an area of the first slicing layer, and the thickness of the second slicing layer is determined based on the difference between the area of the second slicing layer and the area of the first slicing layer.

In various embodiments, the orientation for the third slicing layer is determined based on the second slicing layer having the determined thickness.

In various embodiments, the above-mentioned determining the orientation for the third slicing layer comprises:
  determining a contour of the second slicing layer having the determined thickness based on an intersection between a slicing plane of the second slicing layer having the determined thickness and the 3D model;
  determining a centroid of the contour; and
  determining the orientation for the third slicing layer based on the centroid of the contour.

In various embodiments, the above-mentioned determining the contour comprises:
  determining a set of intersection points based on the intersection between the slicing plane of the second slicing layer having the determined thickness and the 3D model; and determining the contour based on the set of intersection points.

In various embodiments, the above-mentioned determining the set of intersection points comprises removing each surface section of the 3D model that has all its vertices below the slicing plane of the second slicing layer having the determined thickness with respect to a coordinate system.

In various embodiments, the above-mentioned determining the orientation for the third slicing layer further comprises determining an area of the contour based on the set of intersection points, and wherein the centroid of the contour is determined based on the area of the contour determined.

In various embodiments, the above-mentioned determining the thickness of the second slicing layer and the orientation for the third slicing layer comprises determining the thickness of the second slicing layer and the orientation for the third slicing layer iteratively, wherein for each iteration, the thickness of the second slicing layer and the orientation of the third slicing layer are re-determined based on a difference between the second slicing layer with the thickness as determined at the immediately preceding iteration and the first slicing layer.

In various embodiments, the 3D model is a 3D mesh model, and the method further comprises:
  determining, for each intersection point in the set of intersection points, an orientation for a print head for printing at the intersection point based on an intersection between a radial plane and a contour of the third slicing layer, the radial plane including the intersection point and is normal to the slicing plane of the second slicing layer.

In various other embodiments, the method further comprising:
  obtaining a parametric surface model of the 3D object; and
  determining, for each intersection point in the set of intersection points, an orientation for a print head for printing at the intersection point based on a projected point on the parametric surface model from the intersection point, the projected point being a point on the parametric surface model nearest to the intersection point.

According to a second aspect of the present invention, there is provided a system for additive manufacturing, the system comprising:
  a memory; and
  at least one processor communicatively coupled to the memory and configured to:
    determine a first slicing layer of a three-dimensional (3D) model of a 3D object;
    determine a second slicing layer of the 3D model based on the first slicing layer, the second slicing layer being immediately subsequent to the first slicing layer; and
    determine a thickness of the second slicing layer and an orientation for a third slicing layer of the 3D model based on a difference between the second slicing layer and the first slicing layer, the third slicing layer being immediately subsequent to the second slicing layer.

In various embodiments, the difference is based on an area of the second slicing layer and an area of the first slicing layer, and the thickness of the second slicing layer is determined based on the difference between the area of the second slicing layer and the area of the first slicing layer.

In various embodiments, the orientation for the third slicing layer is determined based on the second slicing layer having the determined thickness.

In various embodiments, the above-mentioned determine the orientation for the third slicing layer comprises:
  determining a contour of the second slicing layer having the determined thickness based on an intersection between a slicing plane of the second slicing layer having the determined thickness and the 3D model;
  determining a centroid of the contour; and
  determining the orientation for the third slicing layer based on the centroid of the contour.

In various embodiments, the above-mentioned determine the contour comprises:
  determining a set of intersection points based on the intersection between the slicing plane of the second slicing layer having the determined thickness and the 3D model; and
  determining the contour based on the set of intersection points.

In various embodiments, the above-mentioned determine the set of intersection points comprises removing each surface section of the 3D model that has all its vertices below the slicing plane of the second slicing layer having the determined thickness with respect to a coordinate system, and the above-mentioned determine the orientation for the third slicing layer further comprises determining an area of the contour based on the set of intersection points, and wherein the centroid of the contour is determined based on the area of the contour determined.

In various embodiments, the above-mentioned determine the thickness of the second slicing layer and the orientation for the third slicing layer comprises determining the thickness of the second slicing layer and the orientation for the third slicing layer iteratively, wherein for each iteration, the thickness of the second slicing layer and the orientation of the third slicing layer are re-determined based on a difference between the second slicing layer with the thickness as determined at the immediately preceding iteration and the first slicing layer.

In various embodiments, the 3D model is a 3D mesh model, and the at least one processor is further configured to:
  determine, for each intersection point in the set of intersection points, an orientation for a print head for printing at the intersection point based on an intersection between a radial plane and a contour of the third slicing layer, the radial plane including the intersection point and is normal to the slicing plane of the second slicing layer.

In various other embodiments, the at least one processor is further configured to:
  obtain a parametric surface model of the 3D object; and
  determine, for each intersection point in the set of intersection points, an orientation for a print head for printing at the intersection point based on a projected point on the parametric surface model from the intersection point, the projected point being a point on the parametric surface model nearest to the intersection point.

According to a third aspect of the present invention, there is provided a computer program product, embodied in one or more non-transitory computer-readable storage mediums, comprising instructions executable by at least one processor to perform a method of additive manufacturing, the method comprising:
  determining a first slicing layer of a three-dimensional (3D) model of a 3D object;

determining a second slicing layer of the 3D model based on the first slicing layer, the second slicing layer being immediately subsequent to the first slicing layer; and determining a thickness of the second slicing layer and an orientation for a third slicing layer of the 3D model based on a difference between the second slicing layer and the first slicing layer, the third slicing layer being immediately subsequent to the second slicing layer.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 3 depicts an example computer system which the system as described with respect to FIG. 2 may be embodied in;

DETAILED DESCRIPTION

Figure 1:
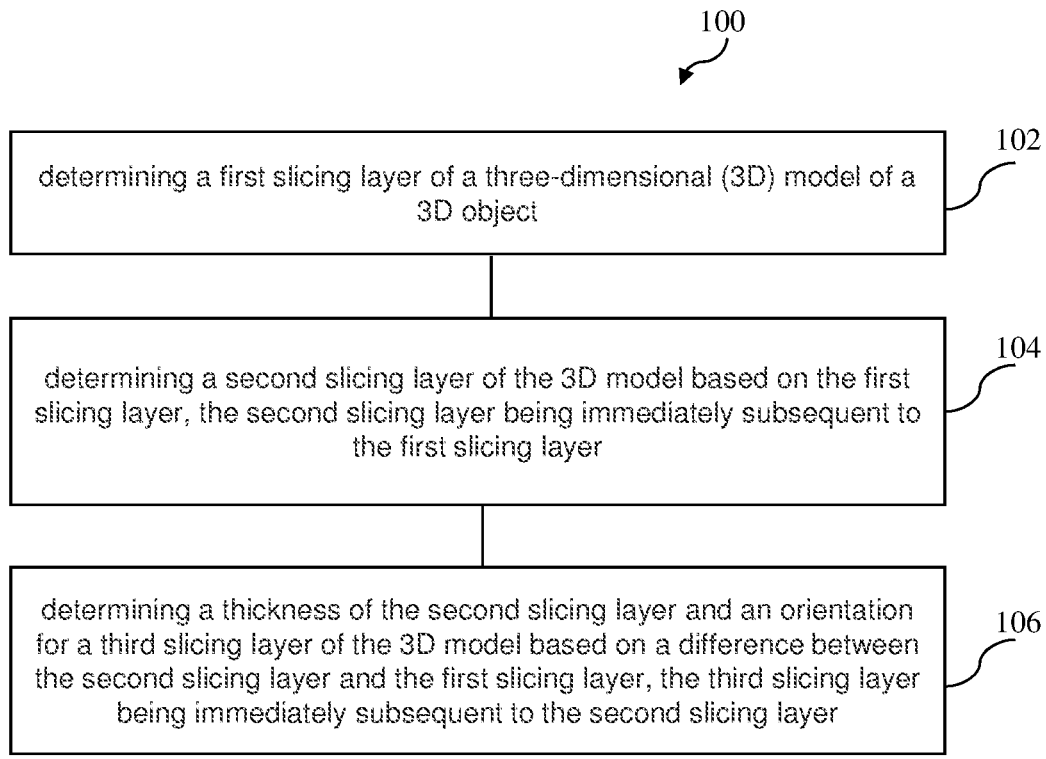
FIG. 1 depicts a schematic flow diagram of a method of additive manufacturing using at least one processor according to various embodiments of the present invention.

Various embodiments of the present invention provide a method (computer-implemented method) and a system including a memory and at least one processor communicatively coupled to the memory) for additive manufacturing, and more particularly, for slicing a three-dimensional (3D) model of a 3D object for additive manufacturing (or 3D printing).

A 3D model is a digital representation of a 3D object (e.g., 3D part) in computer-aided design (CAD) and computer-aided manufacturing (CAM). In other words, the 3D object desired to be printed is digitally represented by a 3D model. In various embodiments, the 3D model is a 3D mesh model. In various embodiments, the 3D mesh model may be a polygon mesh model comprising a set of polygon faces (which may also be referred to as facelets or surface sections) that are connected by their common edges. In various embodiments, the polygon mesh model is a 3D triangle mesh model comprising a set of triangular faces that are connected by their common edges. Each triangular face may be defined by three vertices (not in the same straight line), and each vertex may be denoted by three coordinate values (x, y, z) and may be defined by a vector in 3D space. Two triangular faces may be considered connected if they share a common edge defined by two vertices. The 3D model may be stored in an appropriate file format. For example and without limitation, a 3D triangle mesh model may be stored in a STL (stereolithography) file format (.STL).

In additive manufacturing, in order to print a 3D object, it is necessary to slice the 3D model of the 3D object into multiple layers (a series of layers, which may also be referred to as slicing layers or slices) having 2D cross-sectional shapes. As described in the background, various conventional slicing methods exist for slicing a 3D model into a series of layers, however, they suffer from various problems that affect the quality of the resultant 3D object printed. Various embodiments of the present invention provide a method and a system for additive manufacturing, and more particularly, for slicing a 3D model of a 3D object for additive manufacturing (or 3D printing), that seeks to improve the quality (e.g., surface quality, such as reducing or minimizing staircase effect) of the resultant 3D object printed. In addition, in various embodiments, the method and system further generates or determines a print head trajectory (or print head path) that seeks to further improve the quality (e.g., surface quality, such as reducing or minimizing materials deposited at inaccurate locations and/or having undesired form/shape) of the resultant 3D object printed, and more particularly, by determining (e.g., setting or controlling) an orientation for a print head (print head orientation) for printing at each respective point along contours of the series of slicing layers. In various embodiments, the print head trajectory has multiple degrees of freedom (DoF), and in various embodiments, has at least 6-DoF.

FIG. 1 depicts a schematic flow diagram of a method 100 (computer-implemented method) of additive manufacturing using at least one processor. The method 100 comprises determining (at 102) (or generating) a first slicing layer of a 3D model of a 3D object; determining (at 104) a second slicing layer of the 3D model based on the first slicing layer, the second slicing layer being immediately subsequent to the first slicing layer; and determining (at 106) a thickness of the second slicing layer and an orientation for a third slicing layer of the 3D model based on a difference between the second slicing layer and the first slicing layer, the third slicing layer being immediately subsequent to the second slicing layer.

Accordingly, in various embodiments of the present invention for slicing a 3D model of a 3D object for additive manufacturing, both a thickness and an orientation of a slicing layer is determined (e.g., computed, instead of being predefined values), which advantageously improves the quality (e.g., surface quality, such as reducing or minimizing staircase effect) of the resultant 3D object printed. For example, for the above-mentioned third slicing layer, its thickness is determined based on a difference between the third slicing layer and its immediately previous slicing layer (the second slicing layer) and its orientation is determined based on a difference between its immediately previous two slicing layers (between the second slicing layer and the first slicing layer). For example, the thickness and orientation of each slicing layer subsequent to the third slicing layer is also determined in the same or corresponding manner In particular, unless stated or the context requires otherwise, it will be appreciated by a person skilled in the art that the first, second and third slicing layers mentioned herein refer to any three consecutive slicing layers in a set of slicing layers of the 3D model.

In various embodiments, in relation to 106, determining a thickness of the second slicing layer includes modifying (or adjusting or updating) a predefined layer thickness for slicing the 3D model. For example, the predefined (or predetermined) layer thickness may be a nominal layer thickness specified prior to slicing, such as predefined by a user or a default layer thickness.

In various embodiments, the thickness (or height) of a slicing layer may be determined (or computed) based on a point on a slicing plane of the slicing layer and a corresponding point on a slicing plane of an immediately previous slicing layer. In various embodiments, such a point may be a centroid of the slicing layer in its slicing plane.

In various embodiments, in relation to 106, determining an orientation for a third slicing layer includes determining (e.g., computing) an orientation for slicing the 3D model to obtain the third slicing layer such that the third slicing layer has a slicing plane having such an orientation. It will be appreciated by a person skilled in the art that an orientation may be defined by or expressed as a vector, for example, an orientation of a plane may be defined by or expressed as a normal vector to the plane. For example, an orientation for slicing the 3D model may be defined by a normal vector such that the 3D model is slice along a slicing plane defined by the normal vector.

In various embodiments, the orientation for (or of) a slicing layer may be defined by or expressed as a normal vector of the slicing layer (or a normal vector of a slicing plane of the slicing layer).

In various embodiments, in relation to 106, the difference is based on an area of the second slicing layer and an area of the first slicing layer. In this regard, the thickness of the second slicing layer is determined based on the difference between the area of the second slicing layer and the area of the first slicing layer. In various embodiments, the area of a slicing layer may be determined (e.g., computed) with respect to its slicing plane.

In various embodiments, the thickness of the second slicing layer may be determined based on a function (e.g., thickness determining function) that is dependent on the above-mentioned difference between the area of the second slicing layer and the area of the first slicing layer. In various embodiments, the function may be configured to such that the thickness determined is inversely related (e.g., inversely proportional) to the above-mentioned difference.

In various embodiments, the orientation for the third slicing layer is determined based on the second slicing layer having the determined thickness. For example, in various embodiments as described hereinbefore, determining the thickness of the second slicing layer includes modifying a predefined layer thickness for slicing the 3D model. In such embodiments, the orientation for the third slicing layer is determined based on the second slicing layer having the modified thickness. Furthermore, as will be described later below, in various embodiments, the thickness of the second slicing layer and the orientation for the third slicing layer are determined iteratively (in an iterative manner). In such embodiments, in each iteration, the orientation for the third slicing layer is determined based on the second slicing layer having the thickness determined (or as modified) in the current iteration. For example, in the current iteration, the thickness of the second slicing layer may be re-determined (e.g., modified or updated) based on the above-mentioned difference between the second slicing layer having the thickness as determined (or as modified) at the immediately preceding (or previous) iteration and the first slicing layer. In this regard, the orientation for the third slicing layer may be re-determined based on the second slicing layer having the thickness as modified in the current iteration.

In various embodiments, in relation to 106, determining the orientation for the third slicing layer comprises: determining a contour of the second slicing layer (having the determined thickness) based on an intersection between a slicing plane of the second slicing layer (having the determined thickness) and the 3D model; determining a centroid of the contour; and determining the orientation for the third slicing layer based on the centroid of the contour.

In various embodiments, a contour (e.g., long-axis contour) may be an outline representing or bounding a 2D shape formed based on an intersection between a slicing plane of a slicing layer (e.g., based on the above-mentioned intersection between the slicing plane of the second slicing layer (having the determined thickness)) and the 3D model. For example, if the 3D model is a triangle mesh model, the contour may be a polygon formed by the above-mentioned intersection between the slicing plane of the second slicing layer (having the determined thickness) and the 3D model.

In various embodiments, the above-mentioned determining the orientation for the third slicing layer based on the centroid of the contour includes determining the orientation based on the centroid of the contour of the second slicing layer (having the determined thickness) and the corresponding centroid of the contour of the immediately previous slicing layer (e.g., the first slicing layer). In various embodiments, such an orientation for the third slicing layer is determined based on a normal vector directing from the centroid of the contour of the first slicing layer to (or passing through) the centroid of the contour of the second slicing layer.

In various embodiments, the above-mentioned determining the contour comprises: determining a set of intersection points based on the intersection between the slicing plane of the second slicing layer (having the determined thickness) and the 3D model; and determining the contour based on the set of intersection points. For example, in various embodiments, the contour may be formed by or defined by the set of intersection points, such as by connecting or joining the set of intersection points (a line joining each pair of adjacent intersection points).

In various embodiments, the above-mentioned determining the set of intersection points comprises removing each surface section (which may also be referred to as a face or facelet) of the 3D model that has all its vertices below the slicing plane of the second slicing layer (having the determined thickness) with respect to a coordinate system (e.g., a global coordinate system or frame). For example, as described hereinbefore, the 3D model may be stored in a data file (in an appropriate file format). In this regard, each surface section of the 3D model stored in the data file which has all its vertices below the slicing plane of the second slicing layer with respect to a global coordinate system is removed from the data file. By removing such surface sections of the 3D model from the file, they will not be further processed or examined (e.g., queried) in the slicing process (e.g., during subsequent layers of slicing, such as when determining the intersection points between a subsequent slicing plane and the 3D model), thus advantageously improving the efficiency of the slicing process (e.g., reduce slicing time), as well as saving memory space.

In various embodiments, in relation to 106, determining the orientation for the third slicing layer further comprises determining an area of the contour based on the set of intersection points. Thereafter, the centroid of the contour may be determined based on the area of the contour determined.

In various embodiments, in relation to 106, determining the thickness of the second slicing layer and the orientation for the third slicing layer comprises determining the thickness of the second slicing layer and the orientation for the third slicing layer iteratively (in an iterative manner). In particular, for each iteration (or cycle), the thickness of the second slicing layer and the orientation of the third slicing layer are re-determined (e.g., modified or updated) based on a difference between the second slicing layer having the thickness as determined at the immediately preceding (or previous) iteration and the first slicing layer. For example, in a current iteration (or cycle), the thickness of the second slicing layer may be re-determined based on the above-mentioned difference between the second slicing layer having the thickness as determined (or as modified) at the immediately preceding iteration and the first slicing layer, and the orientation for the third slicing layer may be re-determined based on the second slicing layer having the thickness as modified in the current iteration.

In various embodiments, the iteration for determining the thickness of the second slicing layer and the orientation for the third slicing layer may continue until one or more predetermined (or predefined) conditions are satisfied, such as a predetermined maximum number of iterations is reached and/or the difference(s) of one or more parameters determined (e.g., the orientation determined) between a current iteration and an immediately previous iteration satisfies a predetermined (or predefined) tolerance threshold.

In various embodiments, subsequent (or additional) slicing layers (e.g., each subsequent slicing layer) of the 3D model may be determined in the same or similar manner as described hereinbefore, to produce a set of slicing layers (e.g., including the first slicing layer, the second slicing layer, the third slicing layer and each subsequent slicing layer determined) for the 3D model. Accordingly, in various embodiments, the method 100 comprises determining, for each subsequent slicing layer, a thickness of the subsequent slicing layer and an orientation for a second subsequent slicing layer of the 3D model based on a difference (e.g., as described hereinbefore) between the subsequent slicing layer and a previous slicing layer, the second subsequent slicing layer being immediately subsequent to the subsequent slicing layer and the subsequent slicing layer being immediately subsequent to the previous slicing layer. That is, the above-mentioned previous slicing layer, subsequent slicing layer and second subsequent slicing layer are three consecutive slicing layers. It will be appreciated by a person skilled in the art that for the last slicing layer in the set of slicing layer, it is not necessary to determine the orientation for any further subsequent slicing layer since there is no further subsequent slicing layer.

Accordingly, in various embodiments of the present invention for slicing a 3D model of a 3D object for additive manufacturing, both a thickness and an orientation of a slicing layer is determined (e.g., computed, instead of being predefined values), which advantageously improves the quality of the resultant 3D object printed (e.g., surface quality, such as reducing or minimizing staircase effect). Furthermore, in various embodiments, as both the thickness and the orientation of a slicing layer are determined iteratively (e.g., modified or updated at each iteration until one or more predetermined conditions are satisfied), the quality of the resultant 3D object printed further improves (e.g., further reducing or minimizing the staircase effect).

As mentioned hereinbefore, in various embodiments, the method 100 further comprises determining (or generating) a print head trajectory (or print head path) that seeks to further improve the quality of the resultant 3D object printed, and more particularly, by determining (e.g., setting or controlling) an orientation for a print head (print head orientation) for printing at each respective point along contours of the series of slicing layers. In various embodiments, the print head trajectory has multiple degrees of freedom (DoF), and in various embodiments, preferably has at least 6-DoF.

In various embodiments, the 3D model is a 3D mesh model (e.g., 3D triangle mesh model), and the method 100 further comprises determining, for each intersection point in the set of intersection points (associated with the set of slicing layers determined as described hereinbefore), an orientation for a print head for printing at the intersection point based on an intersection between a radial plane and a contour of the third slicing layer, the radial plane including the intersection point and is normal to the slicing plane of the second slicing layer. In various embodiments, the orientation for a print head for printing at an intersection point may be determined based on a vector directing from the intersection point along the contour of the second slicing layer to (or passing through) the point along the contour of the third slicing layer that intersects with the above-mentioned radial plane.

In various other embodiments, the method 100 further comprises: obtaining a parametric surface (e.g., non-uniform rational basis spline (NURBS)) model of the 3D object; and determining, for each intersection point in the set of intersection points, an orientation for a print head for printing at the intersection point based on a projected point on the parametric surface model from the intersection point, the projected point being a point on the parametric surface model nearest to the intersection point. In various embodiments, the orientation for a print head for printing at an intersection point may be determined based on a vector from the intersection point along the contour of the second slicing layer to (or passing through) the projected point on the parametric surface model.

For example, by determining an orientation for a print head (or print head orientation) for printing at each intersection point associated with the set of slicing layers in the manner as described herein according to various embodiments, the print head orientation is advantageously able to adapt to the local surface curvature at the respective intersection point, which enables or facilitates the focus of the materials (e.g., in powder or wire form) projected (or ejected) from the print head to accurately fall (deposit) on the previously deposited layer, thereby reducing or minimizing materials deposited at inaccurate locations and/or having undesired form/shape. In various embodiments, the print head orientation advantageously has at least 6-DoF.

Figure 2:
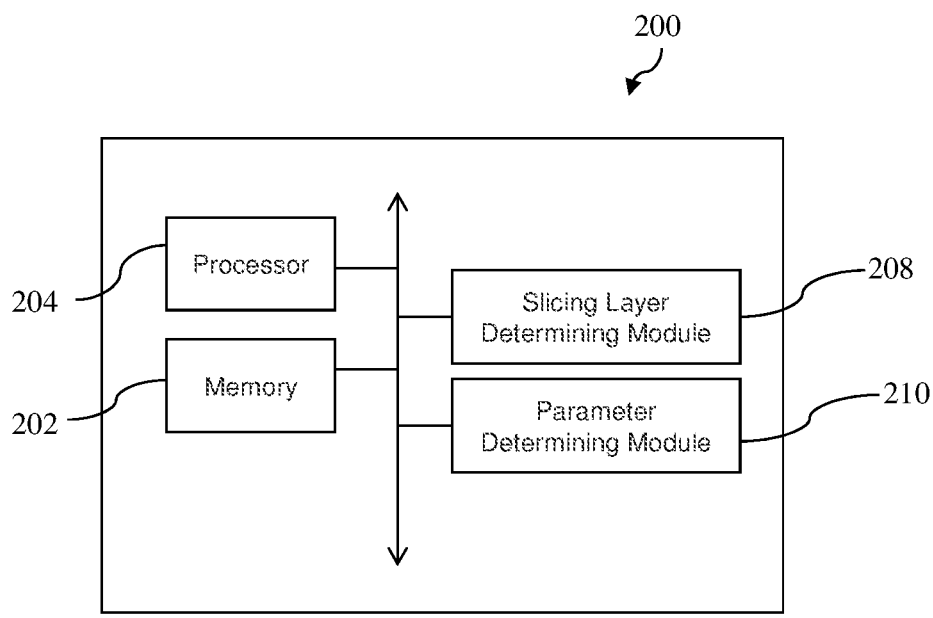
FIG. 2 depicts a schematic block diagram of a system for additive manufacturing according to various embodiments of the present invention, such as corresponding to the method of additive manufacturing as described with respect to FIG. 1.

FIG. 2 depicts a schematic block diagram of a system 200 for additive manufacturing according to various embodiments of the present invention, such as corresponding to the method 100 of additive manufacturing using at least one processor as described hereinbefore according to various embodiments of the present invention. The system 200 comprises a memory 202, and at least one processor 204 communicatively coupled to the memory 202 and configured to: determine a first slicing layer of a 3D model of a 3D object; determine a second slicing layer of the 3D model based on the first slicing layer, the second slicing layer being immediately subsequent to the first slicing layer; and determine a thickness of the second slicing layer and an orientation for a third slicing layer of the 3D model based on a difference between the second slicing layer and the first slicing layer, the third slicing layer being immediately subsequent to the second slicing layer.

It will be appreciated by a person skilled in the art that the at least one processor 204 may be configured to perform the required functions or operations through set(s) of instructions (e.g., software modules) executable by the at least one processor 204 to perform the required functions or operations. Accordingly, as shown in FIG. 2, the system 200 may further comprise a slicing layer determining module (or slicing layer determining circuit) 208 and a parameter determining module (or parameter determining circuit) 210. The slicing layer determining module 208 is configured to determine a first slicing layer of a 3D model of a 3D object, and to determine a second slicing layer of the 3D model based on the first slicing layer, the second slicing layer being immediately subsequent to the first slicing layer. The parameter determining module 210 is configured to determine a thickness of the second slicing layer and an orientation for a third slicing layer of the 3D model based on a difference between the second slicing layer and the first slicing layer, the third slicing layer being immediately subsequent to the second slicing layer. It will be appreciated to a person skilled in the art that the system 200 may be embodied as a device or an apparatus.

It will be appreciated by a person skilled in the art that the above-mentioned modules are not necessarily separate modules, and one or more modules may be realized by or implemented as one functional module (e.g., a circuit or a software program) as desired or as appropriate without deviating from the scope of the present invention. For example, the slicing layer determining module 208 and the parameter determining module 210 may be realized (e.g., compiled together) as one executable software program (e.g., software application or simply referred to as an "app"), which for example may be stored in the memory 202 and executable by the at least one processor 204 to perform the functions/operations as described herein according to various embodiments.

In various embodiments, the system 200 corresponds to the method 100 as described hereinbefore with reference to FIG. 1, therefore, various functions or operations configured to be performed by the least one processor 204 may correspond to various steps of the method 100 described hereinbefore according to various embodiments, and thus need not be repeated with respect to the system 200 for clarity and conciseness. In other words, various embodiments described herein in context of the methods are analogously valid for the respective systems (e.g., which may also be embodied as devices), and vice versa.

For example, in various embodiments, the memory 202 may have stored therein the slicing layer determining module 208 and the parameter determining module 210, which respectively correspond to various steps of the method 100 as described hereinbefore according to various embodiments, which are executable by the at least one processor 204 to perform the corresponding functions/operations as described herein.

A computing system, a controller, a microcontroller or any other system providing a processing capability may be provided according to various embodiments in the present disclosure. Such a system may be taken to include one or more processors and one or more computer-readable storage mediums. For example, the system 200 described hereinbefore may include a processor (or controller) 204 and a computer-readable storage medium (or memory) 202 which are for example used in various processing carried out therein as described herein. A memory or computer-readable storage medium used in various embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be a special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result.

The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "determining", "modifying", "adjusting", "computing", "updating" or the like, refer to the actions and processes of a computer system (e.g., which may also be embodied as an electronic device), that manipulates and transforms data represented as physical quantities within the computer system into other data similarly represented as physical quantities within the computer system or other information storage, transmission or display devices.

The present specification also discloses a system (e.g., which may also be embodied as a device or an apparatus) for performing the operations/functions of the methods described herein. Such a system may be specially constructed for the required purposes, or may comprise a general purpose computer or other device selectively activated or reconfigured by a computer program stored in the computer. The algorithms presented herein are not inherently related to any particular computer or other apparatus. Various general-purpose machines may be used with computer programs in accordance with the teachings herein. Alternatively, the construction of more specialized apparatus to perform the required method steps may be appropriate.

In addition, the present specification also at least implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention. It will be appreciated by a person skilled in the art that various modules described herein (e.g., the slicing layer determining module 208 and/or the parameter determining module 210) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of a computer program/module or method described herein may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums (non-transitory computer-readable storage medium), comprising instructions (e.g., corresponding to the slicing layer determining module 208 and the parameter determining module 210) executable by one or more computer processors to perform a method 100 of additive manufacturing as described hereinbefore with reference to FIG. 1. Accordingly, various computer programs or modules described herein may be stored in a computer program product receivable by a system therein, such as the system 200 as shown in FIG. 2, for execution by at least one processor 204 of the system 200 to perform the required or desired functions.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the software or functional module(s) described herein can also be implemented as a combination of hardware and software modules.

It will be appreciated by a person skilled in the art that the system 200 may be embodied as a separate (stand-alone) unit or embodied as a functional unit/component of an apparatus or an equipment (e.g., a machine), such as an additive manufacturing apparatus or equipment comprising a robot arm and an end effector arranged at an end of the robot arm, the end effector being or comprising a print head (e.g., which may also be referred to as a print head end effector)). In various embodiments, the print head can be moved/positioned and oriented via the robot arm to have at least 6 DoF, based on the print head trajectory determined as described herein according to various embodiments.

Figure 3:
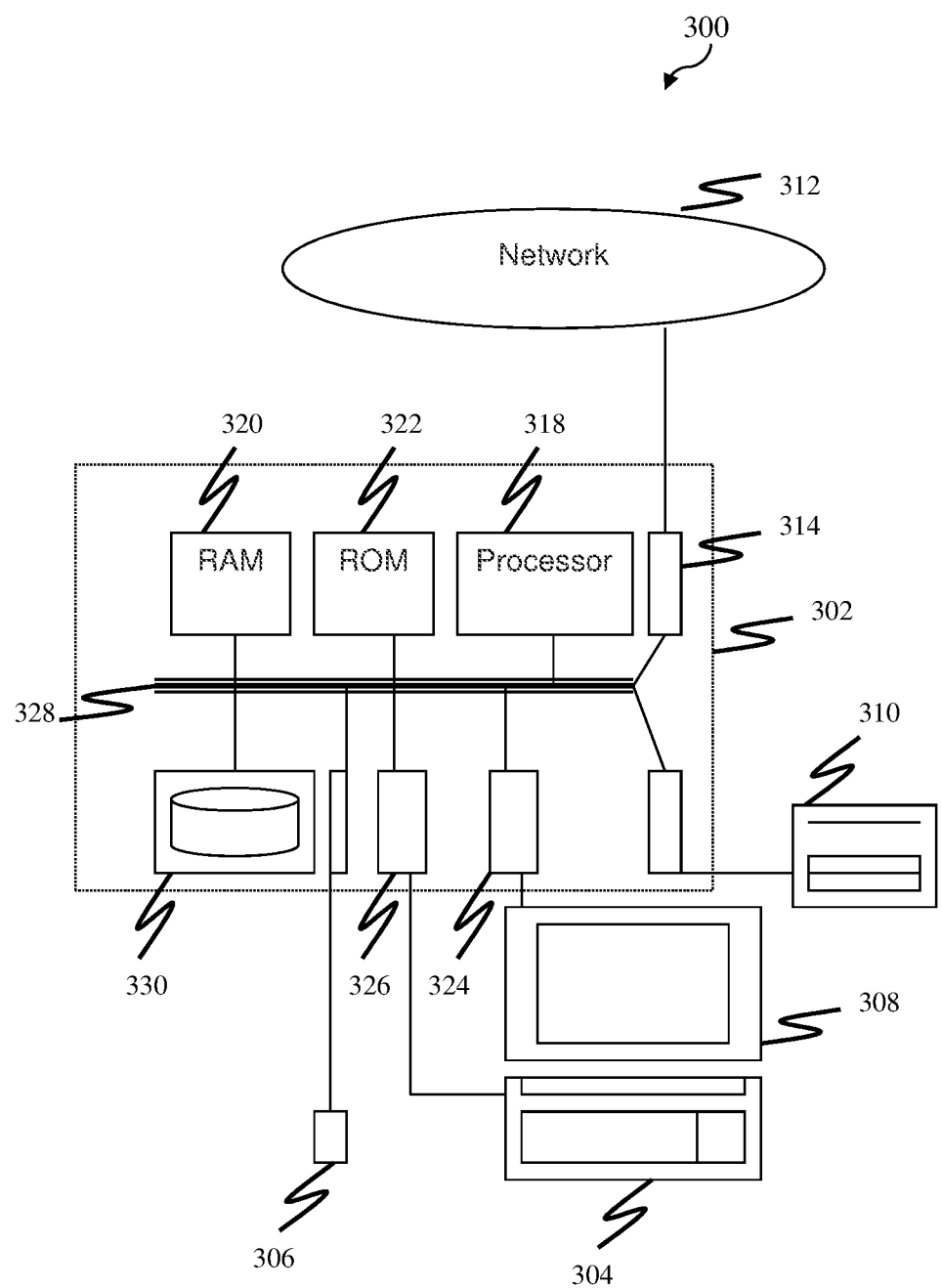

In various embodiments, the system 200 may be realized by any computer system (e.g., portable or desktop computer system, such as tablet computers, laptop computers, mobile communications devices (e.g., smart phones), and so on) including at least one processor and a memory, such as a computer system 300 as schematically shown in FIG. 3 as an example only and without limitation. Various methods/steps or functional modules (e.g., the slicing layer determining module 208 and the parameter determining module 210) may be implemented as software, such as a computer program being executed within the computer system 300, and instructing the computer system 300 (in particular, one or more processors therein) to conduct the methods/functions of various embodiments described herein. The computer system 300 may comprise a computer module 302, input modules, such as a keyboard 304 and a mouse 306, and a plurality of output devices such as a display 308, and a printer 310. The computer module 302 may be connected to a computer network 312 via a suitable transceiver device 314, to enable access to e.g., the Internet or other network systems such as Local Area Network (LAN) or Wide Area Network (WAN). The computer module 302 in the example may include a processor 318 for executing various instructions, a Random Access Memory (RAM) 320 and a Read Only Memory (ROM) 322. The computer module 302 may also include a number of Input/Output (I/O) interfaces, for example I/O interface 324 to the display 308, and I/O interface 326 to the keyboard 304. The components of the computer module 302 typically communicate via an interconnected bus 328 and in a manner known to the person skilled in the relevant art.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

In particular, for better understanding of the present invention and without limitation or loss of generality, various example embodiments of the present invention will now be described with respect to the 3D model being a 3D mesh model and the print head having 6-DoF.

Various example embodiments of the present invention provide an adaptive directional 3D mesh slicing and 6-DoF print head trajectory planning method for additive manufacturing. In particular, various example embodiments provide a method (computer implemented method) for automatically slicing a 3D mesh model and generate a 6-DoF print head trajectory for additive manufacturing.

For example, with conventional slicing methods, there exist problems whereby the layer thickness is constant and/or the change of slicing layer orientation cannot be calculated when there is no intersection between adjacent layers' contours (when projected onto the X-Y plane). For example, conventional directional slicing methods may calculate the change of slicing plane orientation based on the geometries of intersection region(s) between adjacent slices (adjacent layers' contours) projected on a reference plane (e.g., X-Y plane). However, in such conventional directional slicing methods, slicing orientation shifts cannot be calculated when there is no intersection (e.g., only a twist or size change) between adjacent slices. In addition, such conventional directional slicing methods fail to adapt the slice thickness along the object's axial direction. In contrast, for example, various example embodiments determine both the thickness and the orientation of a slicing layer (e.g., computed, instead of being predefined values) in an iterative manner, which advantageously improves the quality of the resultant 3D object printed.

Conventional methods also do not adapt to local curvatures of inclination angle at each point on the object's surface. Therefore, the focus of the materials (e.g., in powder or wire form) projected from the print head may be deposited on the previous deposited layer inaccurately. For example, a certain amount of the projected materials may bypass the previous deposited layer and fall outside the intended build region. In contrast, for example, various example embodiments provide a method to determine (e.g., compute) the 6-DoF print head orientation at each point (e.g., corresponding to the "intersection point" as described hereinbefore) along the print head trajectory path, to ensure or at least facilitate the correct focus of the projected material on top of the previous deposited layer.

Furthermore, in conventional slicing methods for additive manufacturing, all faces in the 3D mesh model may be examined or processed during each layer of slicing, which can be time consuming In contrast, various embodiments of the present invention perform slicing from the lowest layer to the highest layer, and all faces below the current layer are removed from the original mesh file. Therefore, such faces removed will not be further examined or processed in all subsequent layers of slicing, thus advantageously improving the efficiency of the slicing process (e.g., reduce slicing time), as well as saving memory space.

Therefore, various example embodiments of the present invention slice 3D mesh models and generate the 6-DoF print head trajectory for direct energy deposition additive manufacturing equipment (e.g., powder/wire feeding additive manufacturing equipment) and other 5 (or more)-axis 3D printers in general. Both the slicing plane orientation and the layer thickness are calculated (or updated) for each layer (each slicing layer) in an iterative manner (e.g., except the first two slicing layers (in this context, e.g., the lowest or bottom-most two slicing layers)). In this regard, it will be appreciated by a person skilled in the art that the first slicing layer (in this context, e.g., the lowest or bottom-most slicing layer) may not have both its thickness and orientation determined (e.g., computed) and the second slicing layer (in this context, e.g., the second lowest or bottom-most slicing layer) may not have its orientation determined (e.g., computed) in the manner as described hereinbefore since the first slicing layer does not have any previous layer based on to determine its thickness and orientation and the second slicing layer does not have two previous layers based on to determine its orientation. Thus, the first slicing layer may have a predefined thickness and orientation and the second slicing layer may have the same predefined orientation as the first slicing. Furthermore, in various example embodiments, the print head position and orientation along the print head trajectory are adapted to the local surface curvature of the 3D object.

By way of an illustrative example and without limitation, an example method of additive manufacturing (mesh slicing and trajectory generation) using at least one processor, such as the processor 204 of the system 200 as shown in FIG. 2, will now be described below according to various example embodiments of the present invention.

(1) A 3D mesh model is read. For example, the 3D object (e.g., 3D part) to be printed may be represented by a 3D mesh model (e.g., in the .STL format) comprising triangular faces. Each face is defined by three vertices not in the same straight line, and each vertex may be denoted by three coordinate values (x, y, z) and may be defined by a vector in 3D space. In this regard, two faces are considered connected if they share a common edge defined by two vertices. In the static global coordinate frame, for example, X and Y axes define the horizontal plane, while the Z axis points vertically upwards (perpendicular to the horizontal plane). For example, the minimum Z values ($Z_{min}$) of the 3D mesh model may be obtained by querying the vertices' coordinates. The nominal layer thickness (H) may be specified prior to slicing, and for example, may be predetermined or predefined by a user or may be a default layer thickness.

In various example embodiments, a 1-D array (SlicesArray) may be created or provided for storing the intersection points of slicing planes and the 3D mesh model, a 1-D array (C_Array) may be created or provided for storing the centroids (C) of polygons formed by the intersection points, and a 1-D array (N_Array) may be created or provided for storing the normal vectors (N) of the slicing planes. For example, SlicesArray, C_Array, and N_Array may be initialized to contain only zero values.

(2) The first layer (in this context, e.g., the lowest or bottom-most layer) may be sliced from the 3D mesh model 404 in the following manner.

(2.1) A variable or parameter indicating the current number (or count) (L) of layer in the slicing process is initialized, for example, L=1.

(2.2) An initial slicing plane (SP) 406 for the first layer 408 may be defined by its normal vector (N) and a point P on the plane, for example, where N=(0, 0, 1) and P=(0, 0, $z_0$). For example, $z_0$ may be set to either $Z_{min}$ or ($Z_{min}$+H) depending on the user's choice.

(2.3) The points where SP 406 intersects the triangular faces of the 3D mesh model 404 may be determined (e.g., calculated) (e.g., corresponding to the "set of intersection points" as described hereinbefore according to various embodiments) and stored in a temporary n×3 matrix (M), where n is the total number of intersection points. Each 3-element row includes the ($x_i$, $y_i$, $z_i$) coordinates of the $i^{th}$ intersection point, where i=1, 2, ..., n.

(2.4) During the search of intersection points, triangular faces with all three vertices below SP 406 are removed from the mesh file and hence they will not be queried in the subsequent layers of slicing in order to reduce slicing time and computation.

(2.5) The area A of the polygon formed by the intersection points in the temporary matrix M may be calculated as:

$$A = \frac{1}{2}\sum_{i=2}^{n} (x_{i-1}y_i - x_i y_{i-1}) \qquad (1)$$

The centroid C=($x_c$, $y_c$, $z_c$) of the polygon formed by the intersection points in M may be calculated as:

$$x_c = \frac{1}{6A}\sum_{i=2}^{n} (x_{i-1} + x_i)(x_{i-1}y_i - x_i y_{i-1}) \qquad (2)$$

$$y_c = \frac{1}{6A}\sum_{i=2}^{n} (y_{i-1} + y_i)(x_{i-1}y_i - x_i y_{i-1})$$

$$z_c = z_0$$

For example, A and C values may be assigned to global variables $A_{last}$ and $C_{last}$, respectively.

(2.6) The temporary matrix M including the intersection points may be stored in the 1-D array (SlicesArray). N and C may be stored in N_Array and C_Array, respectively.

(2.7) The layer count L may then be incremented by 1, i.e., L=L+1.

(3) Subsequent layers (starting from the second layer 412 (in this context, e.g., from the second lowest or bottom-most layer)) may be sliced from the 3D mesh model 404 in the following manner.

Figure 4A:
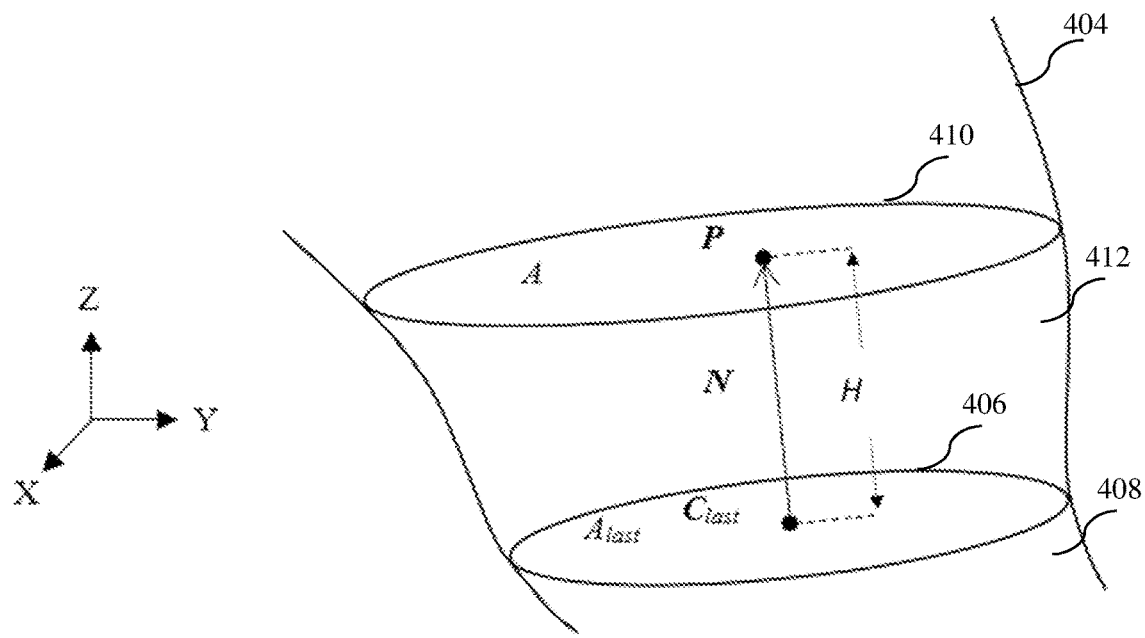
FIGS. 4A to 4D depict schematic drawings illustrating an example method of additive manufacturing, and more particularly, in relation to 3D model slicing, according to various example embodiments of the present invention.

FIG. 4A depicts a schematic drawing illustrating a "pre-slicing" stage, as will be described below in Steps 3.1 and 3.2.

(3.1) The slicing plane SP 410 may be defined by the normal vector N and an updated point P. In this regard, the updated point P may be calculated by adding a distance of H (e.g., nominal layer thickness) to the previous slice's centroid in the direction of the normal vector, that is:

$$P = C + H(N/\|N\|) \qquad (3)$$

$$= (x_c, y_c, z_c) + H\frac{(x_N, y_N, z_N)}{\sqrt{x_N^2 + y_N^2 + z_N^2}}$$

(3.2) "Pre-slicing" is performed to determine (e.g., locate) the points where SP 410 intersects the 3D model 404. The intersection points may then be stored or updated in the matrix M.

Figure 4B:
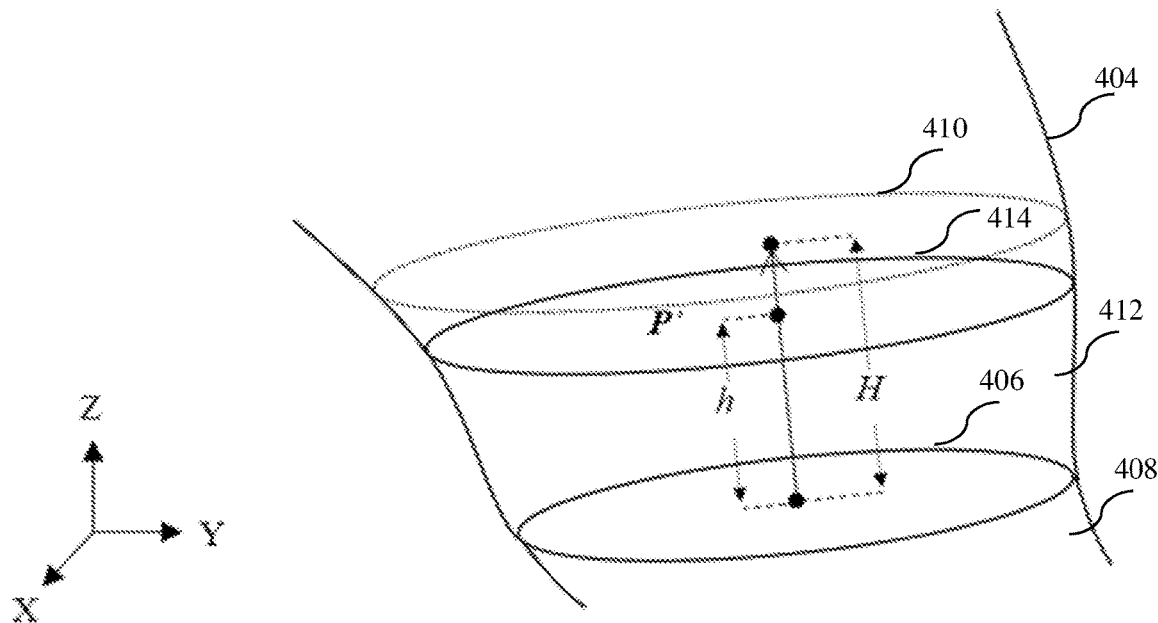

FIG. 4B depicts a schematic drawing illustrating an "update slicing" stage as will be described below in steps 3.3 to 3.6.

(3.3) The area A of the polygon formed by the intersection points in the matrix M, resulting from the "pre-slicing" stage, may be calculated. In various example embodiments, to calculate A, the polygon may be rotated (e.g., if the polygon is not horizontal or parallel to the global X-Y plane) so that it is horizontal or parallel to the global X-Y plane (or orthogonal to the (0, 0, 1) positive Z direction). In an example embodiment, the "axis-angle" rotation from N to (0, 0, 1) may be calculated as:

$$k = \frac{N \times (0, 0, 1)}{\|N \times (0, 0, 1)\|} : \text{the axis of rotation (}k\text{ is a unit vector)} \qquad (4)$$

$$\alpha = \cos^{-1}\left(\frac{N \cdot (0, 0, 1)}{\|N\|}\right) : \text{the angle of rotation}$$

The 3×3 rotation matrix R from N to (0, 0, 1) may be calculated from k and α using the Rodrigues' rotation formula:

$$R = I + (\sin \alpha)K + (1 - \cos \alpha)K^2 \qquad (5)$$

$$\text{where } K = \begin{bmatrix} 0 & -k_3 & k_2 \\ k_3 & 0 & -k_1 \\ -k_2 & k_1 & 0 \end{bmatrix}$$

To rotate the polygon, each intersection point ($x_i$, $y_i$, $z_i$) in the matrix M may be transformed to ($x_i'$, $y_i'$, $z_i'$) by R:

$$[x_i' y_i' z_i']^T = R[x_i y_i z_i]^T \qquad (6)$$

The polygon area A may then calculated as:

$$A = \frac{1}{2}\sum_{i=2}^{n} (x_{i-1}' y_i' - x_i' y_{i-1}') \qquad (7)$$

(3.4) The difference between the area of the polygon (A) and the area of the previous slice's polygon ($A_{last}$) may then be calculated as $\Delta A=|A-A_{last}|$. The layer thickness h may then be determined (e.g., computed or approximated) based on AA and the pre-defined H as follows:

$$h = (\cos \theta)H \qquad (8)$$

$$\text{where } \theta = \tan^{-1}\left(\frac{\sqrt{\Delta A}}{H}\right)$$

(3.5) A further updated point P' may then be calculated using Equation (3) above, but H is replaced by h:

$$P' = C + h(N/\|N\|) \qquad (9)$$

$$= (x_c, y_c, z_c) + h\frac{(x_N, y_N, z_N)}{\sqrt{x_N^2 + y_N^2 + z_N^2}}$$

The updated slicing plane SP 414 may then be defined by the normal vector N and the further updated P'.

(3.6) The "update slicing" stage may be conducted to determine (e.g., locate) the points where the updated slicing plane SP 414 intersects the triangular faces of the 3D model 404. The intersection points may then be stored or updated in the matrix M.

(3.7) During the search of intersection points, triangular faces with all three vertices below SP may be removed from the mesh file, and hence they will not be queried in the subsequent layers of slicing in order to reduce slicing time and computation.

Figure 4C:
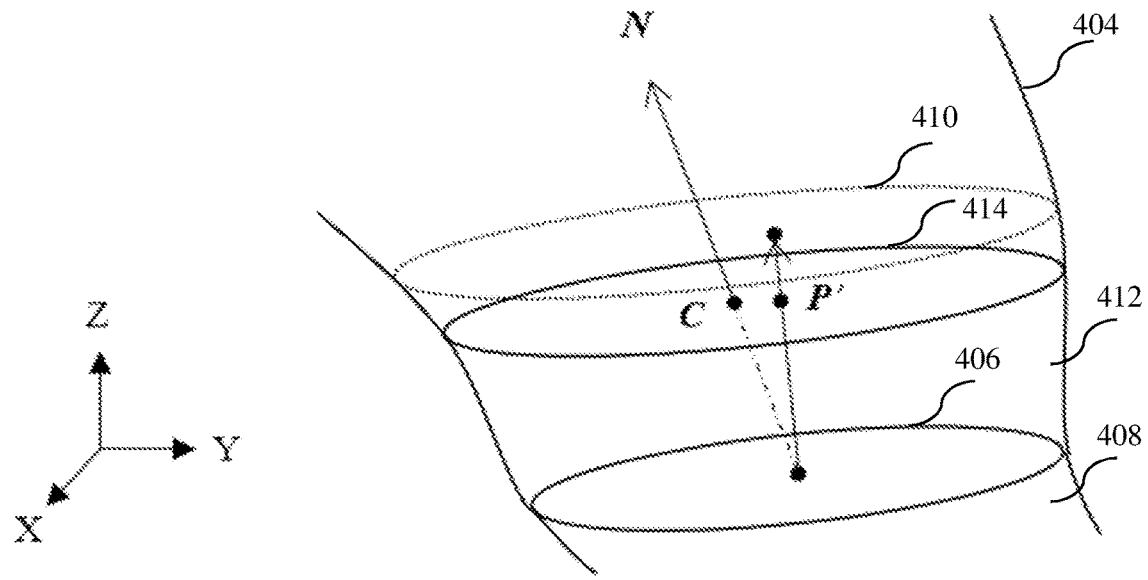

FIG. 4C depicts a schematic drawing illustrating the updating of N and C, as will be described below in Steps 3.8 to 3.12.

(3.8) The centroid C and area A of the polygon formed by the intersection points in M, resulting from the "update slicing" stage, may be calculated.

The ($x_c$, $y_c$) coordinates of the centroid C=($x_c$, $y_c$, $z_c$) may be calculated using Equation (2) above. The $z_c$ value of the centroid may be calculated as:

$$z_c = \frac{N \cdot P' - (n_x x_c + n_y y_c)}{n_z} \qquad (10)$$

where ($n_x$, $n_y$, $n_z$) are the components of N

The area A of the polygon formed by the intersection points in M, resulting from the "update slicing" stage, may be calculated using Equations 4 to 7 above.

(3.9) N may be updated and may be used as the normal vector to define the new (immediately subsequent) slicing plane (SP) 418 in the next layer 420 of slicing. N directs from the centroid of the previous layer ($C_{last}$) 408 to (or passing through) the centroid of the current layer (C) 412, i.e., $$N=C-C_{last} \qquad (11)$$

(3.10) The current or updated A and C values may then be used to update the global variables $A_{last}$ and $C_{last}$, respectively.

(3.11) The temporary matrix M containing the intersection points resulted from the "update slicing" stage may be stored in the next empty location (data field) of SlicesArray. Each occupied location (or non-zero element) of SlicesArray is a matrix including the intersection points obtained in a previous layer. Similarly, the latest N and C may be stored in the next empty location of N_Array and C_Array, respectively.

(3.12) Steps 3.1 to 3.11 may be repeated (in an iterative manner) with N and C updated in each iteration (or cycle). The iteration may be stopped either when the predetermined maximum number of cycles is completed, and/or when both N and C converge to their final values, e.g., the difference of N (or C) between the current cycle and the previous cycle is smaller than the predetermined tolerance $\varepsilon_N$ (or $\varepsilon_C$).

(3.13) The layer count L may then be incremented by 1, that is, L=L+1.

Figure 4D:
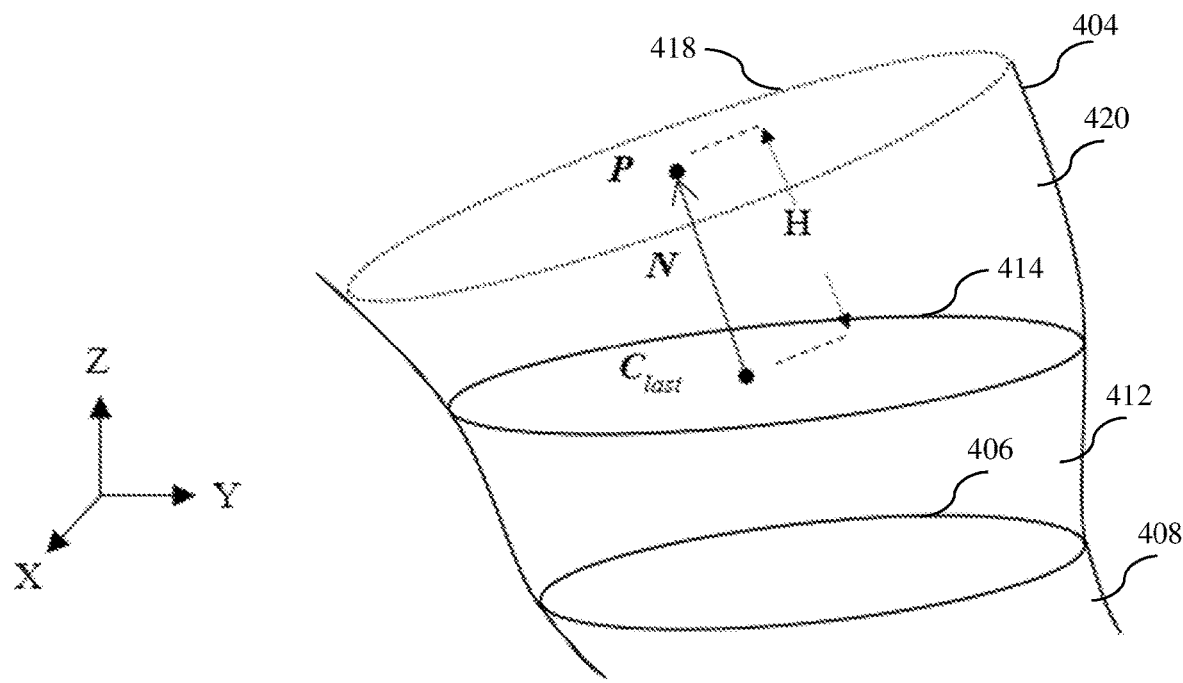

FIG. 4D depicts a schematic drawing illustrating the onset of the next (immediately subsequent) layer 420 of slicing, as will be describe below in Step 3.14.

(3.14) Steps 3.1-3.13 may be repeated for each immediately subsequent layer of slicing in turn until the last layer of slicing, for example, until there is no more triangular faces remaining in the mesh file.

(4) In relation to determining print head trajectory, the orientation of each intersection point in SlicesArray obtained in Steps 2 and 3 may be calculated. For example, all intersection points' positions and orientations in the 3D space may constitute the 6-DoF trajectory for the direct energy deposition additive manufacturing process.

(4.1) The total number of layers derived from the slicing process may be denoted as NumL, whereby NumL=L−1. The print head orientations ($t_{ij}$) of all points on the first layer 408 (more specifically, on the slicing plane 406 of the first layer 408) may be set to be vertically upright (i.e., $t_{ij}$=(0,0, 1)).

(4.2) The directions (either clockwise or counter-clockwise) of all layers of polygon-shaped closed paths derived from the slicing process may be set to be consistent. The vector directing from the starting point of the current ($i^{th}$) layer of path to the second point of the same path may be denoted as $w_i^{1-to-2}$ (i=2, 3, . . . , NumL). The vector directing from the starting point of the previous adjacent layer (($i-1)^{th}$) of path to the second point of the same path may be denoted as $w_{i-1}^{1-to-2}$. If $w_i^{1-to-2} \cdot w_{i-1}^{1-to-2}<0$, the sequence of points in the $i^{th}$ layer of path may be flipped. The $m^{th}$ point in the original sequence may then be at the ($M_i-m+1)^{th}$ position in the flipped sequence ($M_i$ being the total number of points in the $i^{th}$ layer of path).

Figure 5A:
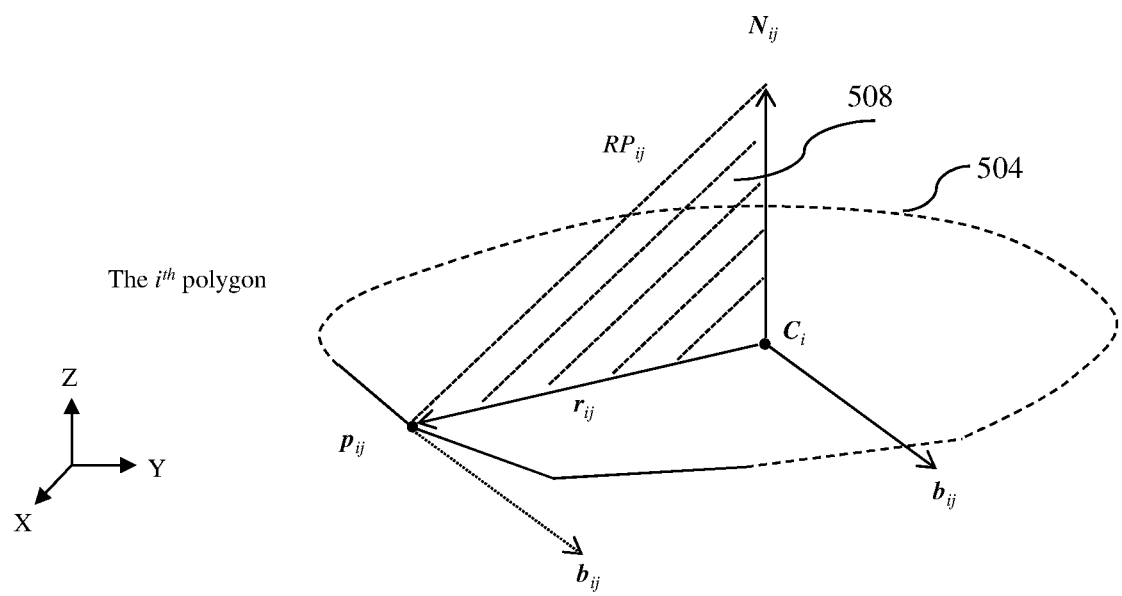
FIGS. 5A and 5B depict schematic drawings illustrating an example method of additive manufacturing, and more particularly, in relation to determining print head orientations along a print head trajectory, according to various example embodiments of the present invention.

FIG. 5A depicts a schematic drawing illustrating a method for determining $r_{ij}$, $b_{ij}$, and $RP_{ij}$, as will be described below in Step 4.3.

(4.3) The $j^{th}$ intersection point in the $i^{th}$ layer 504 may be denoted as $p_{ij}$. The centroid ($C_i$) and normal vector ($N_i$) of the polygon in the $i^{th}$ layer 504 may be retrieved from C_Array and N_Array, respectively. $r_{ij}$ is the vector that directs from $C_i$ to $p_{ij}$. $b_{ij}$ is the unit normal vector of the "radial plane ($RP_{ij}$)" 508 formed by $r_{ij}$, $N_i$, and $p_{ij}$ (or $C_i$). $b_{ij}$ is also parallel to the $i^{th}$ slice 504. For example, $r_{ij}$ and $b_{ij}$ may be calculated as:

$$r_{ij} = p_{ij} - C_i \qquad (12)$$

$$b_{ij} = \frac{N_i \times r_{ij}}{\|N_i \times r_{ij}\|}$$

$$i \in [1, 2, \ldots, NumL], j \in [1, 2, \ldots, M_i]$$

Figure 5B:
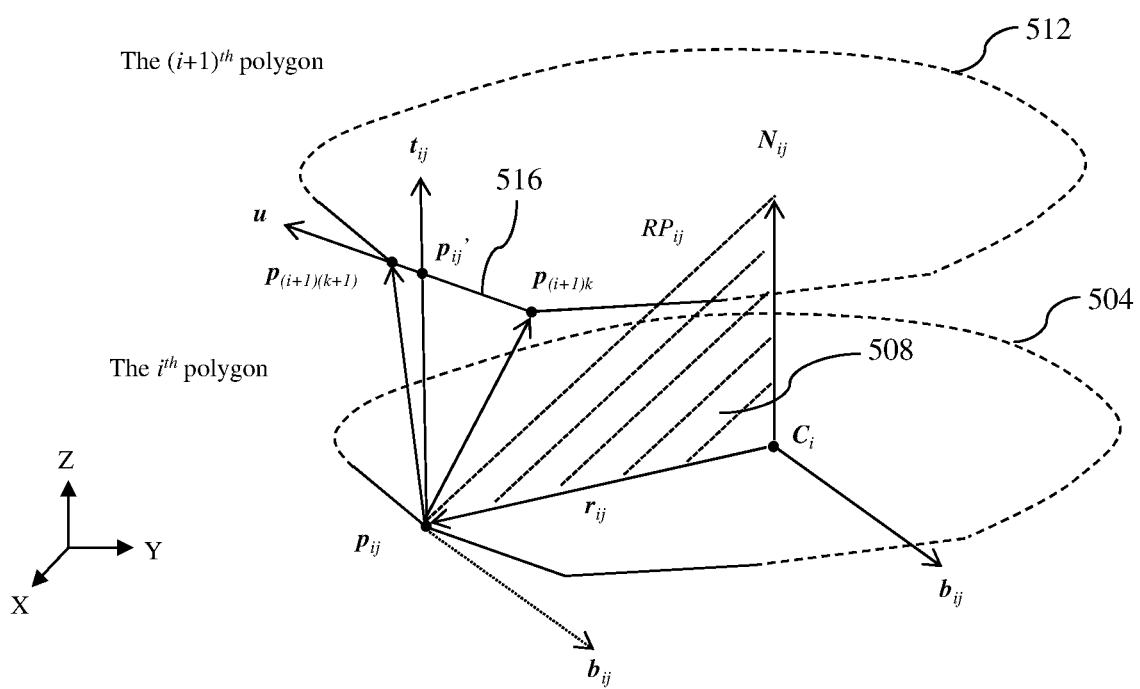

FIG. 5B depicts a schematic drawing illustrating a method for determining the print head orientation $t_{ij}$, as will be described below in Steps 4.4 to 4.7.

(4.4) The intersection point of the radial plane RA, 508 and the next ($(i+1)^{th}$) layer 512 of polygon may be determined (e.g., located) by querying every pair of adjacent points ($p_{(i+1)j}$ and $p_{(i+1)(j+1)}$) in the $(i+1)^{th}$ layer 512. $v_1$ and $v_2$ denote the vectors directing from $p_{ij}$ to $p_{(i+1)j}$ and $p_{(i+1)(j+1)}$ respectively. $d_1$ and $d_2$ denote the signed distances from the radial plane $RP_{ij}$ 508 to and $p_{(i+1)j}$ and $p_{(i+1)(j+1)}$ respectively. For example, $v_1$, $v_2$, $d_1$, and $d_2$ may be calculated as:

$$v_1 = p_{(i+1)j} - p_{ij}$$

$$v_2 = p_{(i+1)(j+1)} - p_{ij}$$

$$d_1 = v_1 \cdot b_{ij}$$

$$d_2 = v_2 \cdot b_{ij}$$

$$i \in [1, 2, \ldots, NumL], j \in [1, 2, \ldots, M_i] \quad (13)$$

(4.5) If a particular ($k^{th}$) pair of adjacent points $p_{(i+1)k}$ and $p_{(i+1)(k+1)}$ are on different sides of $RP_{ij}$, i.e., $d_1 \times d_2 < 0$, the line segment 516 between $p_{(i+1)k}$ and $p_{(i+1)(k+1)}$ intersects with $RP_{ij}$. For example, there may be two intersection locations (hence two pairs of $p_{(i+1)k}$ and $p_{(i+1)(k+1)}$ points) of $RP_{ij}$ and the $(i+1)^{th}$ polygon, and the one closer to $p_{ij}$ (with the shorter $v_1$ and $v_2$ length) may be selected.

(4.6) The intersection point ($p_{ij}'$) of $RP_{ij}$ and the ($p_{(i+1)k}$–$p_{(i+1)(k+1)}$) line segment 516 may be calculated as follows:

$$u = \frac{p_{(i+1)(k+1)} - p_{(i+1)k}}{\|p_{(i+1)(k+1)} - p_{(i+1)k}\|} = (u_x\ u_y\ u_z) \quad (14)$$

$$A = \begin{bmatrix} 1 & 0 & 0 & -u_x \\ 0 & 1 & 0 & -u_y \\ 0 & 0 & 1 & -u_x \\ b_{ij}(x) & b_{ij}(y) & b_{ij}(z) & 0 \end{bmatrix}$$

$$B = [p_{(i+1)k}(x)\ p_{(i+1)k}(y)\ p_{(i+1)k}(z)\ (b_{ij} \cdot p_{ij})]^T$$

$$[x_{sol}\ y_{sol}\ z_{sol}\ t_{sol}]^T = A^{-1} B$$

$$p_{ij}' = (x_{sol}\ y_{sol}\ z_{sol})$$

$$i \in [1, 2, \ldots, NumL], j \in [1, 2, \ldots, M_i]$$

(4.7) The orientation (unit vector $t_{ij}$) of the point $p_{ij}$ may be calculated as:

$$t_{ij} = \frac{p_{ij}' - p_{ij}}{\|p_{ij}' - p_{ij}\|} \quad (15)$$

$$i \in [1, 2, \ldots, NumL], j \in [1, 2, \ldots, M_i]$$

For points $p_{NumLj}$ in the last (the $NumL^{th}$) layer, their orientations may be calculated using the intersection locations (intersection points) of the $RP_{ij}$ plane and the previous ($(NumL-1)^{th}$) polygon. For example, Equations (12) to (15) still apply, but the $p_{(i+1)k}$ and $p_{(i+1)(k+1)}$ points are replaced by $p_{(NumL-1)k}$ and $p_{(NumL-1)(k+1)}$ points. The orientation (unit vector $t_{NumLj}$) may be calculated as:

$$t_{NumLj} = \frac{p_{NumLj} - p_{NumLj}'}{\|p_{NumLj} - p_{NumLj}'\|} \quad (16)$$

$$j \in [1, 2, \ldots, M_{NumL}]$$

(4.8) For example, if a "spiral-up" option is enabled, a spiral-up continuous trajectory (instead of multiple discrete layers of trajectories) is generated. Points ($p_{ij}^{Spiral}$) on the spiral-up trajectory may be calculated based on the original $p_{ij}$ and their corresponding orientations $t_{ij}$, as follows:

$$p_{ij}^{Spiral} = p_{ij} + \left(\frac{j}{M_i}\right) t_{ij} \quad (17)$$

$$i \in [1, 2, \ldots, NumL], j \in [1, 2, \ldots, M_i]$$

(4.9) Subsequently, the positions and orientations of all the 6-DoF trajectory points may be saved into a data file, and for example, in the following form of 6-element arrays:

$$(p_{ij} t_{ij}) = (p_{ij}(x) p_{ij}(y) p_{ij}(z) t_{ij}(x) t_{ij}(y) t_{ij}(z))$$

Or (for spiral-up trajectory):

$$(p_{ij}^{Spiral} t_{ij}) = (p_{ij}^{Spiral}(x) p_{ij}^{Spiral}(y) p_{ij}^{Spiral}(z) t_{ij}(x) t_{ij}(y) t_{ij}(z))$$

$$i \in [1, 2, \ldots, NumL], j \in [1, 2, \ldots, M_i] \quad (18)$$

(5) In various example embodiments, if parametric surfaces (e.g. NURBS surfaces) of the 3D object are available, they may be used in determining (e.g., calculating) the print head orientation along the print head trajectory. For example, parametric surfaces may be generated in most computer-aided design (CAD) software, and they may be saved in various data formats, such as but not limited to, STEP and IGES. A method of determining the print head orientation based on parametric surfaces will now be described below according to various example embodiments of the present invention. Since a mesh model is a geometric approximation of a parametric surface model produced by CAD software, such a method can achieve good accuracy in determining print head orientation.

Figure 6:
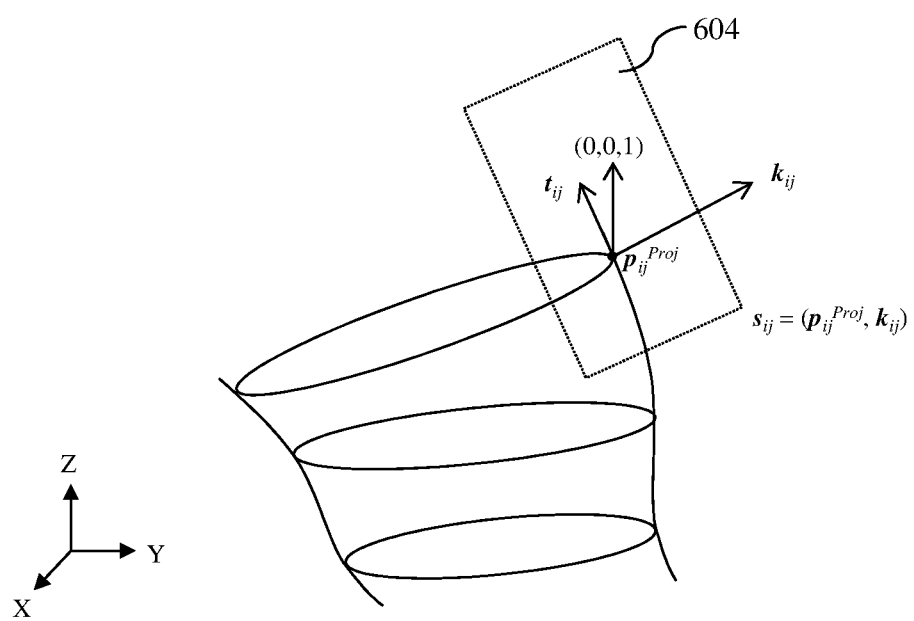
FIG. 6 depicts a schematic drawing illustrating another example method of additive manufacturing, and more particularly, in relation to determining print head orientations along a print head trajectory, according to various example embodiments of the present invention.

FIG. 6 depicts a schematic drawing illustrating a method for determining the print head orientation $t_{ij}$ based on parametric surfaces, as will be described below in Steps 5.1 to 5.6.

(5.1) The print head orientations ($t_{ij}$) of all points on the first layer may be set to be vertically upright (i.e., $t_{ij}$=(0,0, 1)).

(5.2) For each point $p_{ij}$ ($i \in [1, 2, \ldots, NumL]$, $j \in [1, 2, \ldots, M_i]$) on the trajectory that belongs to the outer contour of the current layer, its projected point ($p_{ij}^{Proj}$) on its nearest parametric surface may be determined (e.g., located) by determining the minimum distance between $p_{ij}$ and the parametric surface. It will be appreciated by a person skilled in the art that the method of determining $p_{ij}^{Proj}$ may depend on the actual type of the parametric surface. For example, for NURBS surface, the method as described in Oh, Y. T., et al., "Efficient point-projection to freeform curves and surfaces", Computer Aided Geometric Design, Vol. 29(5), pages 242-254, 2012 (the content of which being hereby incorporated by reference in its entirety for all purposes), may be applied. The distance between $p_{ij}^{Proj}$ and $p_{ij}$ may be small (e.g., sometimes zero) since the vertices of the mesh model may be in close vicinity of (or lie on) the parametric surfaces.

(5.3) The point $p_{ij}^{Proj}$ and the normal vector $k_{ij}$ of the surface on $p_{ij}^{Proj}$ together define the tangent plane 604 of the parametric surface at point $p_{ij}^{Proj}$. It will be appreciated that the normal vector $k_{ij}$ of the surface on $p_{ij}^{Proj}$ may be determined according to techniques known in the art and thus need not be repeated herein for conciseness. By way of an example only, $k_{ij}$ may be determined by $k_{ij}=p_{ij}^{Proj}-p_{ij}$ if $p_{ij}^{Proj}-p_{ij}$ is non-zero. The tangent plane 604 may be represented by the tuple $s_{ij}=(p_{ij}^{Proj}, k_{ij})$.

(5.4) In various example embodiments, the projection ($T_{ij}$) of the vector (0,0,1) on the tangent plane $s_{ij}$ 604 may be calculated as:

$$T_{ij} = (0, 0, 1) - \frac{(0, 0, 1) \cdot k_{ij}}{\|k_{ij}\|^2} k_{ij} \tag{19}$$

$$i \in [1, 2, \ldots, NumL], j \in [1, 2, \ldots, M_i]$$

(5.5) The print head orientation ($t_{ij}$) can then be calculated as the unit vector of $T_{ij}$:

$$t_{ij} = \frac{T_{ij}}{\|T_{ij}\|} \tag{20}$$

$$i \in [1, 2, \ldots, NumL], j \in [1, 2, \ldots, M_i]$$

(5.6) The calculated print head orientation ($t_{ij}$) may then be input to Steps 4.8 and 4.9 if a spiral-up trajectory is desired.

For illustration purposes only and without limitation, various applications of and/or results from the method of additive manufacturing according to various embodiment of the present invention in slicing different 3D objects (or 3D parts) are illustrated in FIGS. 7 to 13.

Figure 7A:
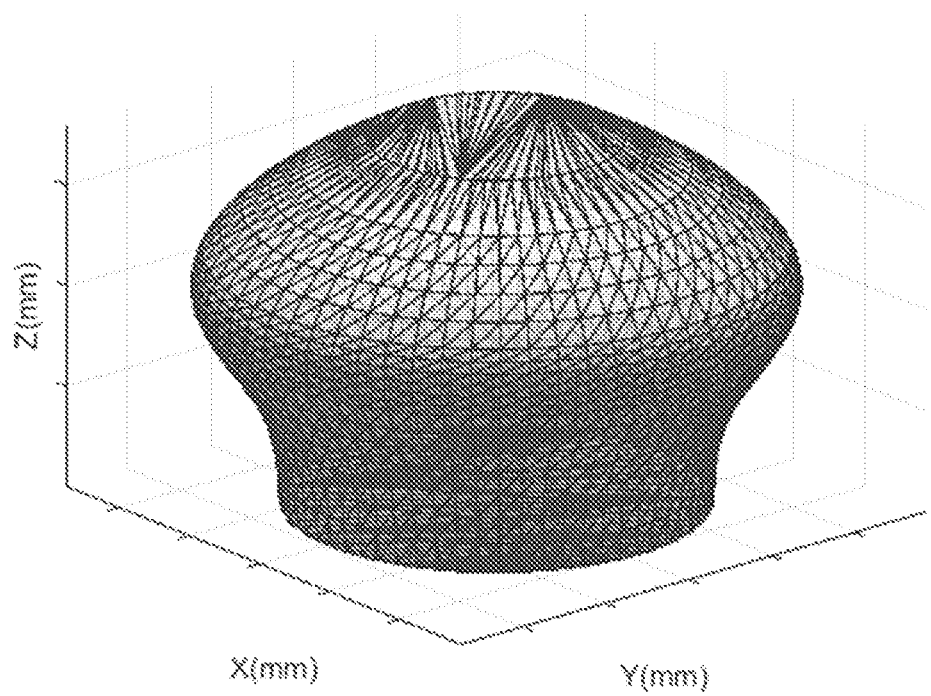
FIGS. 7A to 7C depict schematic drawings illustrating slicing results for an axially symmetrical 3D object according to various example embodiments of the present invention.
Figure 7B:
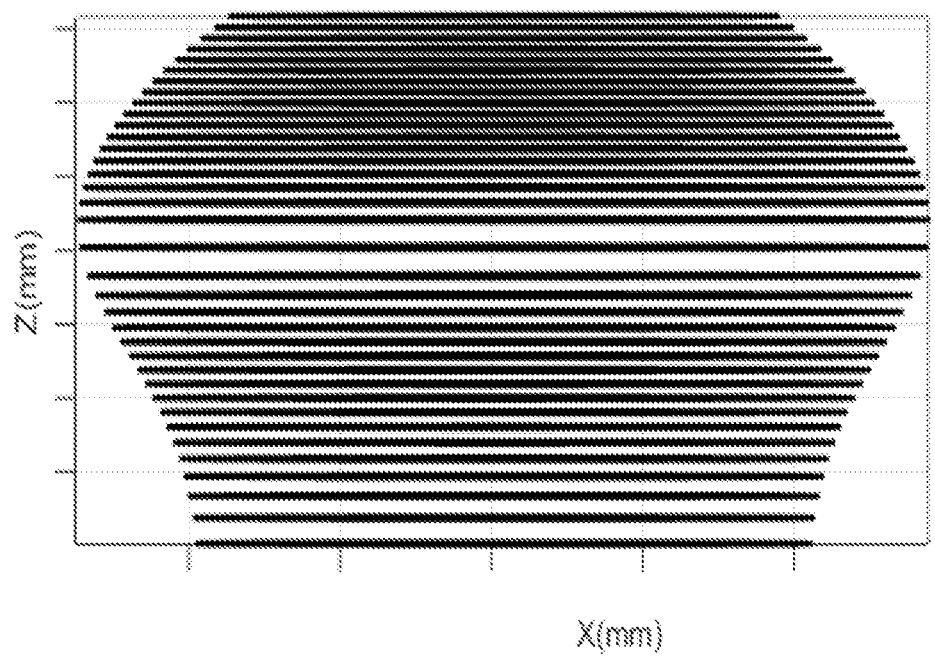
Figure 7C:
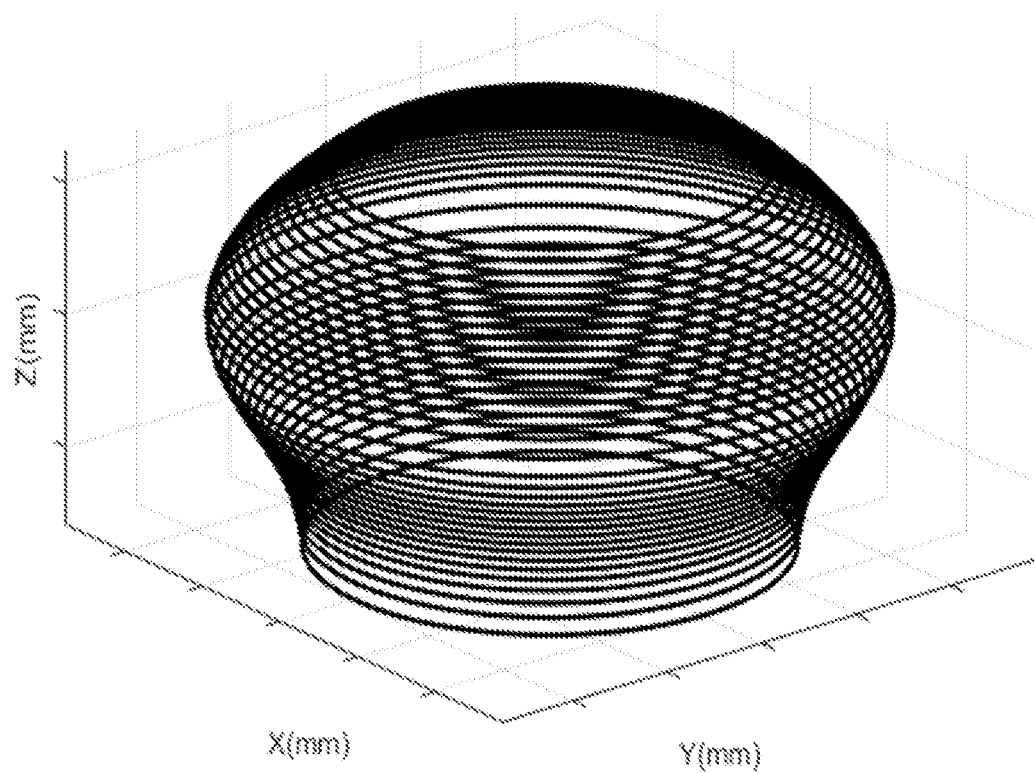

FIGS. 7A to 7C illustrate slicing results for an axially symmetrical 3D object according to various example embodiments of the present invention. It can be seen that the actual layer thickness adapts to the local slope of the object surface. For example, the actual layer thickness is smaller in regions with larger slopes.

Figure 8A:
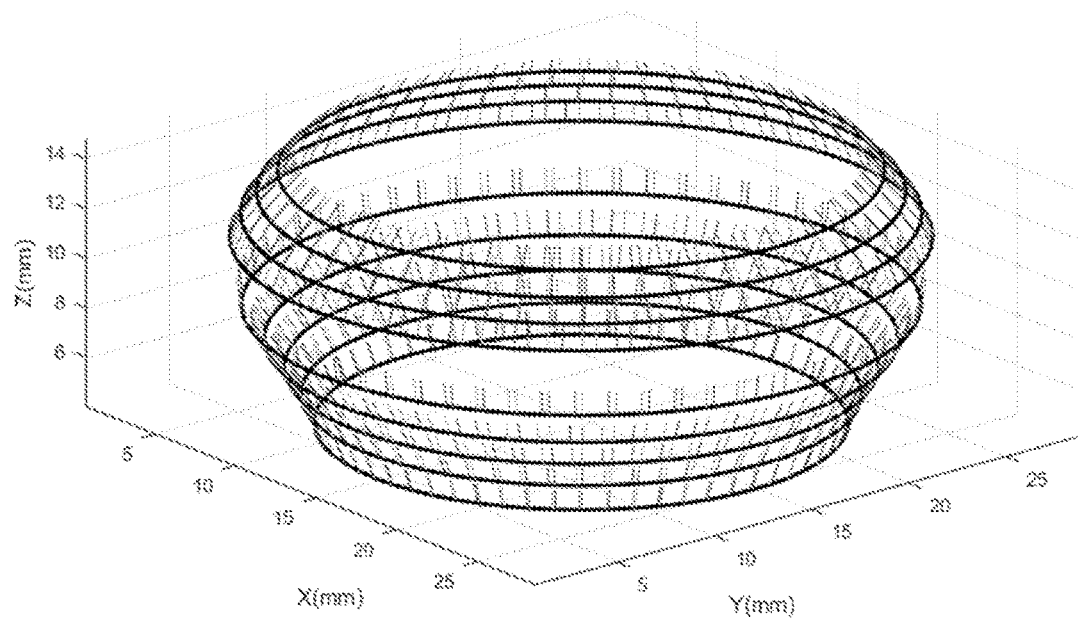
FIGS. 8A and 8B depict schematic drawings illustrating the 6-DoF print head trajectories for the axially symmetrical 3D object in discrete-layer and spiral-up styles or configurations, respectively, according to various example embodiments of the present invention.
Figure 8B:
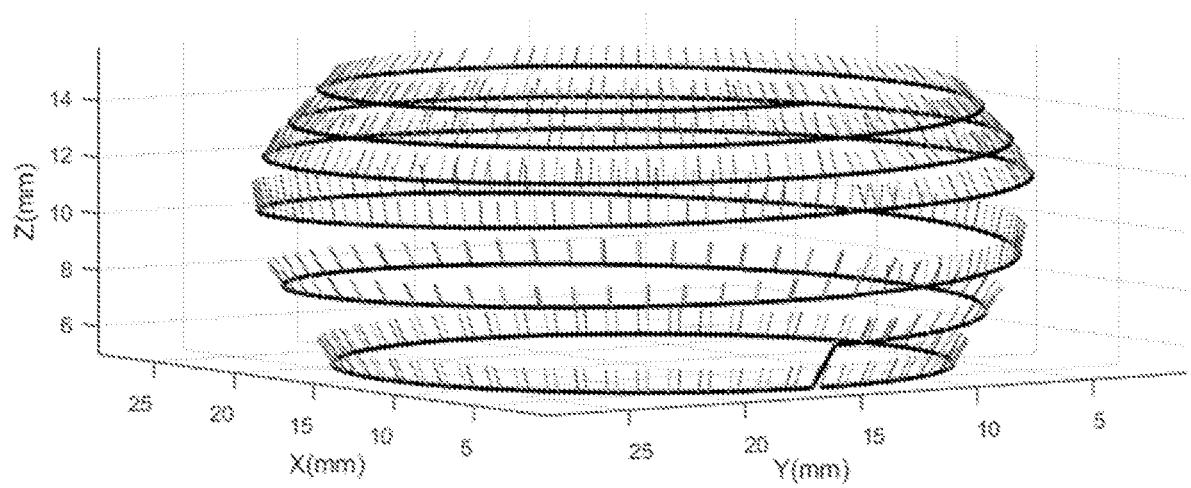

FIGS. 8A and 8B illustrate the 6-DoF print head trajectories for the above-mentioned axially symmetrical 3D object in the discrete-layer and spiral-up styles or configurations, respectively. The short projecting lines indicate the orientation of the print head determined. It can be observed that the orientation is along a line connecting the current layer to the previous lower layer, so that the materials projected from the print head nozzle can fall (be deposited) on the previous layer accurately. For clearer visualization, the nominal layer thickness in FIGS. 8A and 8B are set larger than that in FIGS. 7A to 7C.

Figure 9A:
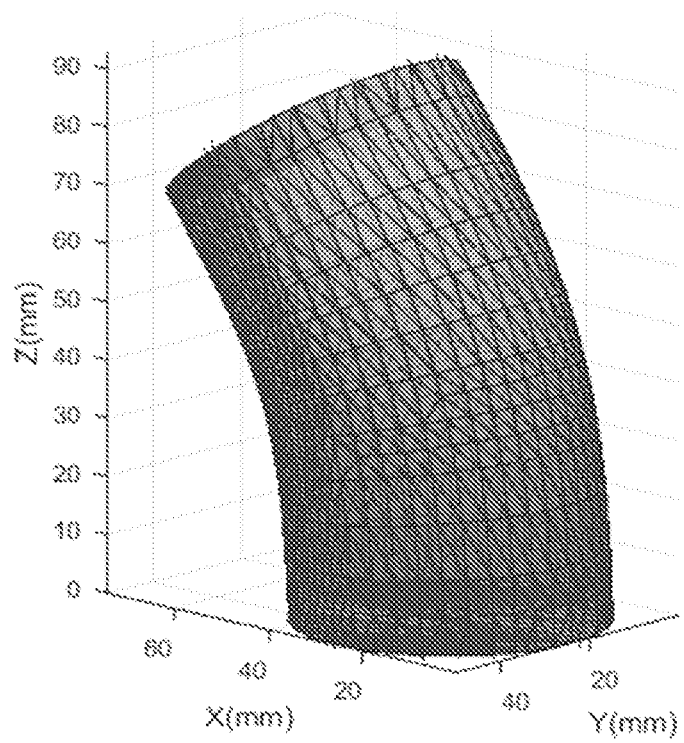
FIGS. 9A and 9B depict schematic drawings illustrating a slicing result for a bended tube, according to various example embodiments of the present invention.
Figure 9B:
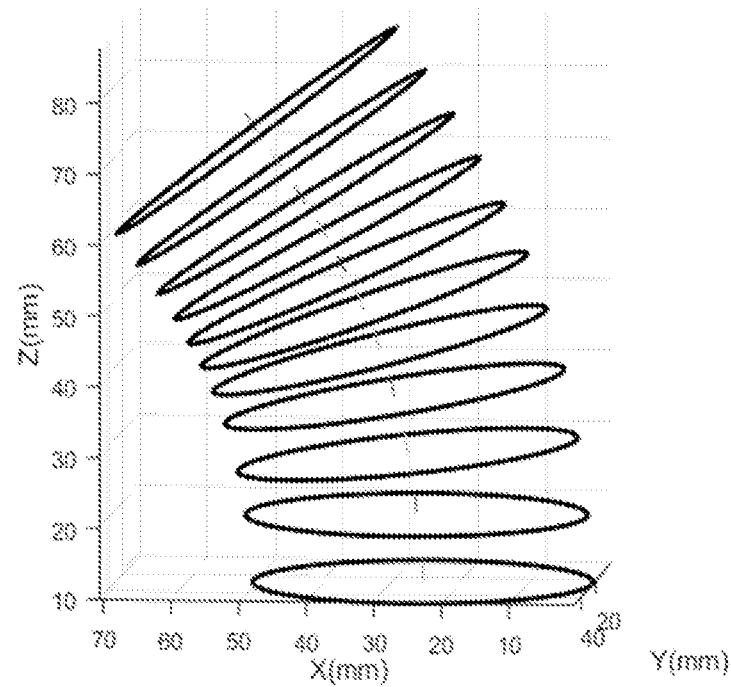
Figure 10A:
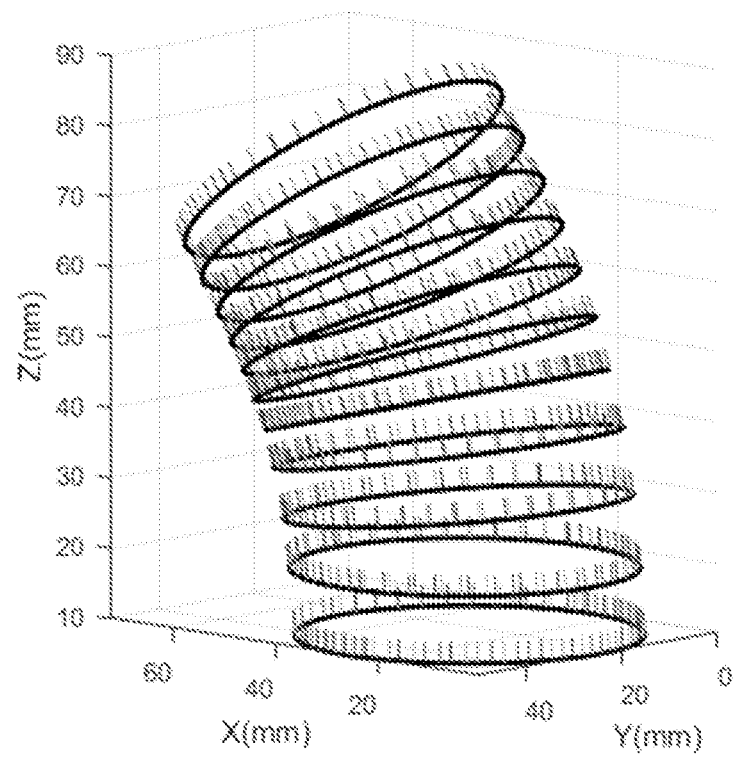
FIGS. 10A and 10B depict schematic drawings illustrating 6-DoF print head trajectories for the bended tube in the discrete-layer and spiral-up styles, respectively, according to various example embodiments of the present invention.
Figure 10B:
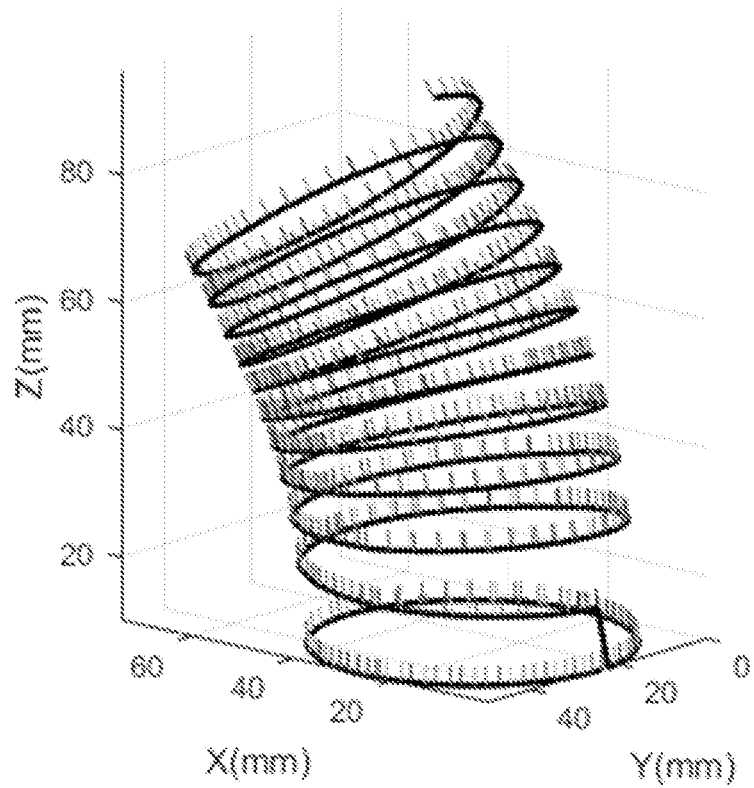

FIGS. 9A and 9B illustrate slicing result for a bended tube according to various example embodiments of the present invention. For example, it can be observed that the slicing plane orientations (indicated by the short/dashed lines at the centroids in FIG. 9B) adapts to the bending shape of the tube. FIGS. 10A and 10B illustrate the 6-DoF print head trajectories for the bended tube in the discrete-layer and spiral-up styles, respectively. Similarly, the short projecting lines indicate the orientation of the print head.

Figure 11B:
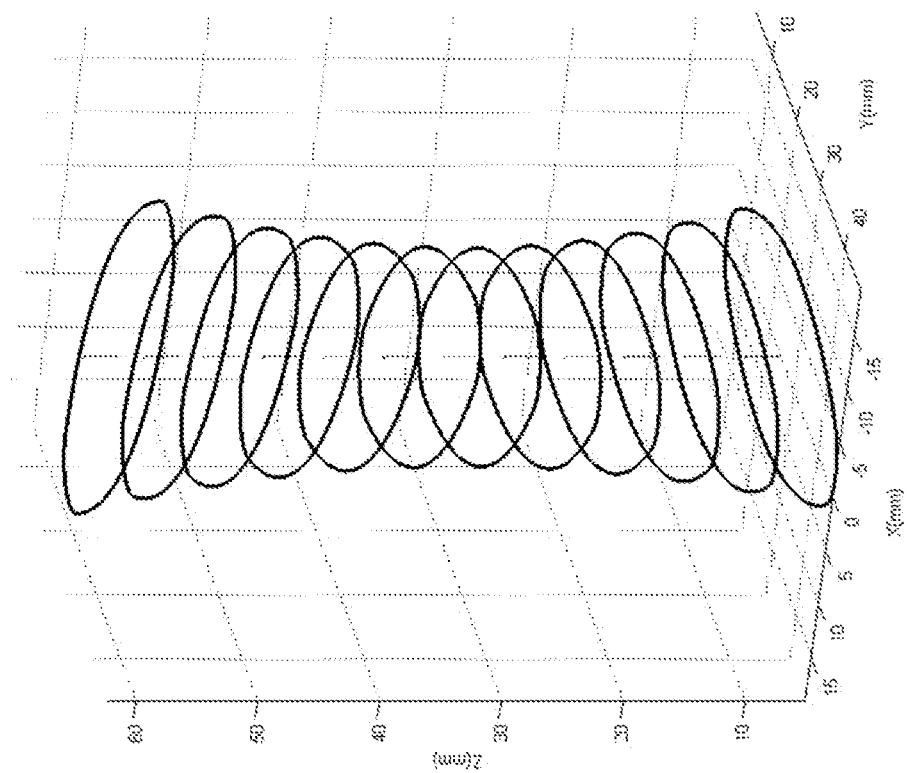
FIGS. 11A and 11B depict schematic drawings illustrating a slicing result of a twisted object, according to various example embodiments of the present invention.
Figure 11A:
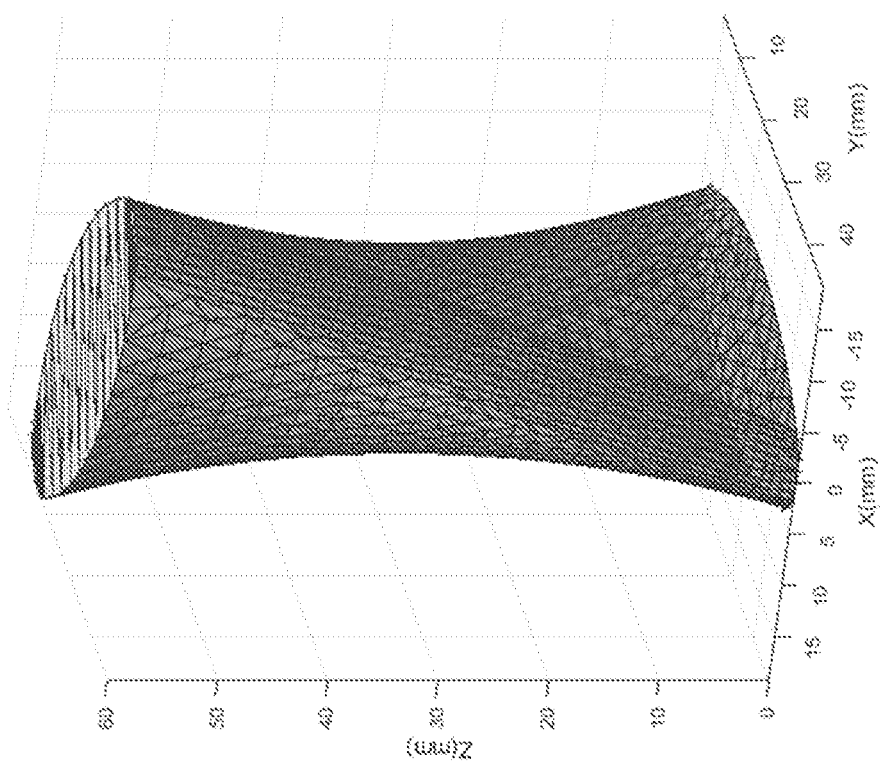
Figure 12B:
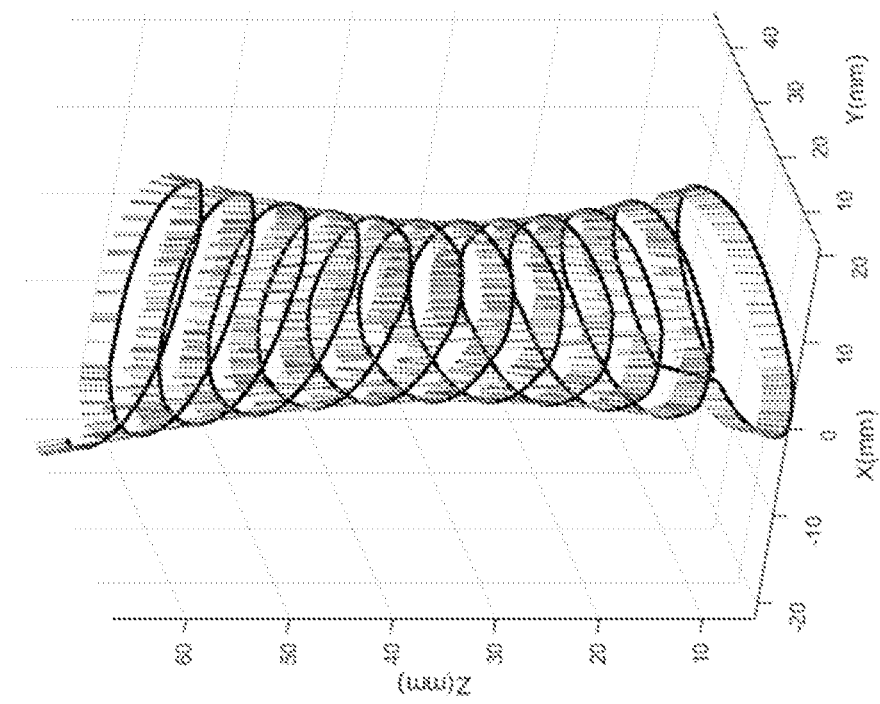
FIGS. 12A and 12B depict schematic drawings illustrating 6-DoF print head trajectories for the twisted object in the discrete-layer and spiral-up styles, respectively, according to various example embodiments of the present invention.
Figure 12A:
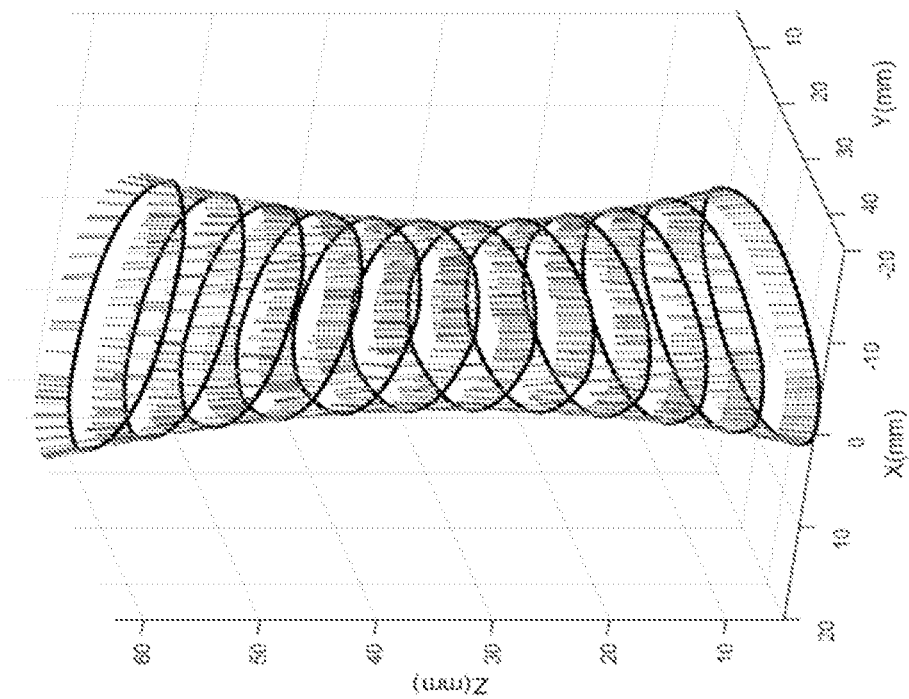

FIGS. 11A and 11B illustrate slicing result of a twisted object or part according to various example embodiments of the present invention. FIGS. 12A and 12B illustrate the 6-DoF print head trajectories for the twisted part in the discrete-layer and spiral-up styles, respectively. Similarly, the short projecting lines indicate the orientation of the print head.

Figure 13:
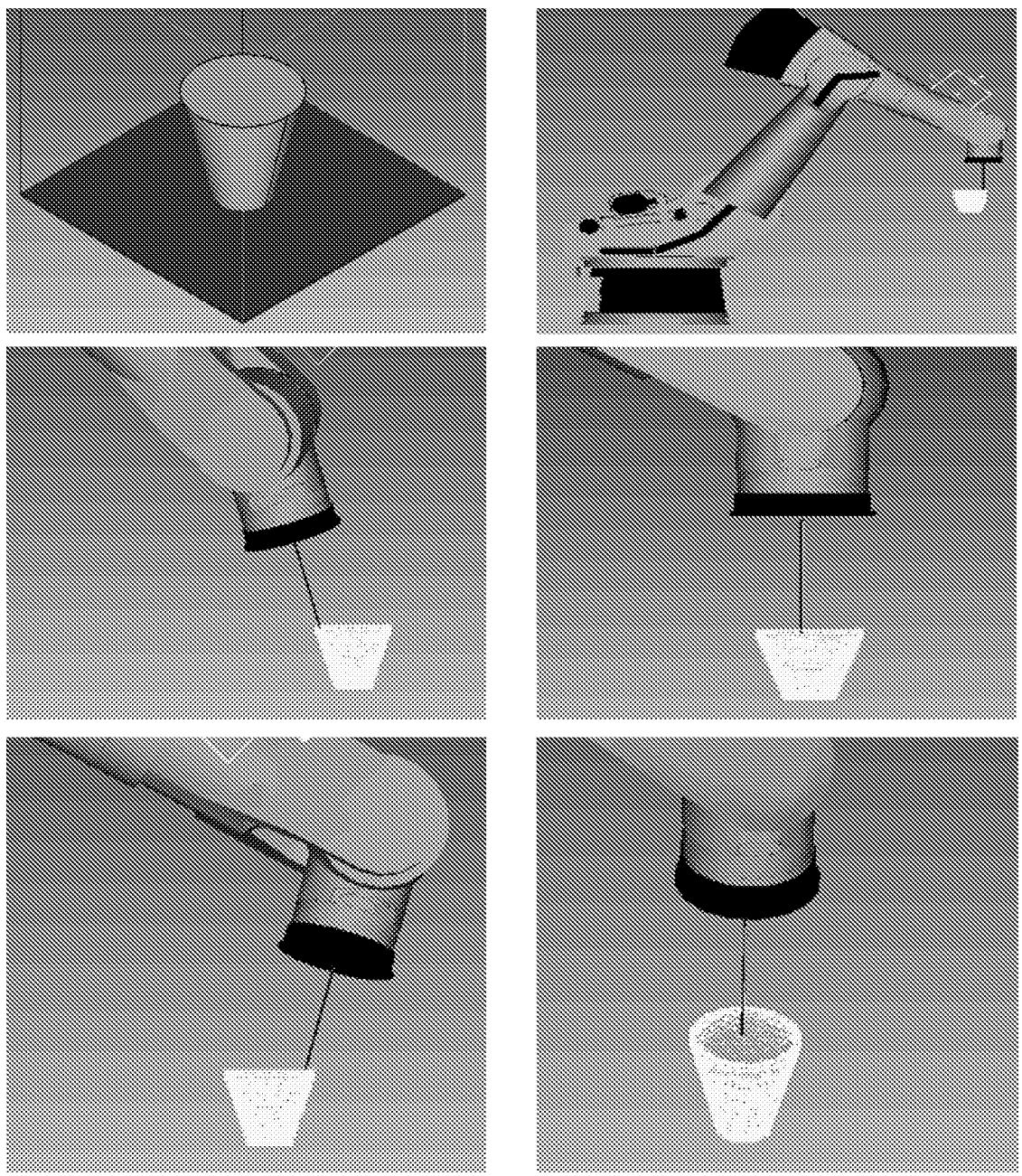
FIG. 13 depict schematic drawings illustrating simulation scenes in which a 3D object is being printed by an industrial robot-based additive manufacturing equipment that allows 6-DoF motion of the print head.

FIG. 13 shows simulation scenes in which a 3D object is being printed by an industrial robot-based additive manufacturing equipment that allows 6-DoF motion of the print head. For example, the adaptation of the print head orientation at locations with different curvature/inclination can be observed. It can also be observed that the print head orientation at the infill of a solid part may be kept vertical with respect to the build platform.

Accordingly, various embodiments of the present invention provide a two-stage slicing ("pre-slicing" and "update slicing" stages) method or algorithm for calculating the slicing plane orientation (N) and layer thickness (h) in an iterative manner, such as described in Steps 3.1 to 3.14 above.

In the slicing process, in various embodiments, triangular surfaces below the slicing plane are removed to reduce searching time in subsequent iterations, such as described in Step 3.7.

Various embodiments provide a method or algorithm for calculating the print head orientations ($t_{ij}$) on the object's outer surface based on the intersection of radial planes and the next adjacent polygon, such as described in Steps 4.1 to 4.7.

Various embodiments provide a method or algorithm for calculating the print head orientations ($t_{ij}$) based on the local normal of parametric freeform surfaces (if available) in the vicinity of each layer's outer contour, such as described in Steps 5.1 to 5.6.

Various embodiments provide a method for generating spiral-up trajectory points ($p_{ij}^{Spiral}$), such as described in Step 4.8.

In the 3D mesh slicing method or algorithm according to various embodiments, the layer thickness, the centroid position, and the slicing plane orientation are all adaptive to the object's general topology and local surface slopes.

In various embodiments, the print head orientation at each point along the trajectory is calculated. The 6-DoF trajectory can be used in direct energy deposition additive manufacturing equipment to ensure that the materials and energy source (e.g. laser beam) can be projected onto the surface of the previously-built layer.

In various embodiments, the 6-DoF spiral-up trajectory is calculated so that the material and energy projection do not need to be paused between discrete layers.

In the slicing method or algorithm according to various embodiments, triangular faces below the slicing plane are deleted from the mesh file and thus are not queried in the subsequent layers of slicing, which has been found to speed up the slicing process.

For example, the 3D mesh slicing and 6-DoF trajectory planning method or algorithm according to various embodiments can be used in various direct energy deposition or other additive manufacturing/3D printing processes that utilize 5 or more axes of print head motion. For example and without limitation, various applications include 3D part fabrication, repairing, and surface cladding for aerospace, automotive, and marine components.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A method of additive manufacturing using at least one processor, the method comprising:
    determining a first slicing layer of a three-dimensional (3D) model of a 3D object;
    determining a second slicing layer of the 3D model based on the first slicing layer, the second slicing layer being immediately subsequent to the first slicing layer;
    determining a thickness of the second slicing layer and an orientation for a third slicing layer of the 3D model based on a difference between the second slicing layer and the first slicing layer, the third slicing layer being immediately subsequent to the second slicing layer; and
    determining a print head trajectory, wherein said determining the print head trajectory comprises controlling an orientation for a print head for printing along a contour of the first slicing layer, the second slicing layer or the third slicing layer.

2. The method according to claim 1, wherein the difference is based on an area of the second slicing layer and an area of the first slicing layer, and the thickness of the second slicing layer is determined based on the difference between the area of the second slicing layer and the area of the first slicing layer.

3. The method according to claim 1, wherein the orientation for the third slicing layer is determined based on the second slicing layer having the determined thickness.

4. The method according to claim 3, wherein said determining the orientation for the third slicing layer comprises:
    determining a contour of the second slicing layer having the determined thickness based on an intersection between a slicing plane of the second slicing layer having the determined thickness and the 3D model;
    determining a centroid of the contour; and
    determining the orientation for the third slicing layer based on the centroid of the contour.

5. The method according to claim 4, wherein said determining the contour comprises:
    determining a set of intersection points based on the intersection between the slicing plane of the second slicing layer having the determined thickness and the 3D model; and
    determining the contour based on the set of intersection points.

6. The method according to claim 5, wherein said determining the set of intersection points comprises removing each surface section of the 3D model that has all its vertices below the slicing plane of the second slicing layer having the determined thickness with respect to a coordinate system.

7. The method according to claim 5, wherein said determining the orientation for the third slicing layer further comprises determining an area of the contour based on the set of intersection points, and wherein the centroid of the contour is determined based on the area of the contour determined.

8. The method according to claim 1, wherein said determining the thickness of the second slicing layer and the orientation for the third slicing layer comprises determining the thickness of the second slicing layer and the orientation for the third slicing layer iteratively, wherein for each iteration, the thickness of the second slicing layer and the orientation of the third slicing layer are re-determined based on a difference between the second slicing layer with the thickness as determined at the immediately preceding iteration and the first slicing layer.

9. The method according to claim 5, wherein the 3D model is a 3D mesh model, and the method further comprises:
    determining, for each intersection point in the set of intersection points, an orientation for the print head for printing at the intersection point based on an intersection between a radial plane and a contour of the third slicing layer, the radial plane including the intersection point and is normal to the slicing plane of the second slicing layer.

10. The method according to claim 5, further comprising:
    obtaining a parametric surface model of the 3D object; and
    determining, for each intersection point in the set of intersection points, an orientation for the print head for printing at the intersection point based on a projected point on the parametric surface model from the intersection point, the projected point being a point on the parametric surface model nearest to the intersection point.

11. A system for additive manufacturing, the system comprising:
    a memory; and
    at least one processor communicatively coupled to the memory and configured to:
        determine a first slicing layer of a three-dimensional (3D) model of a 3D object;
        determine a second slicing layer of the 3D model based on the first slicing layer, the second slicing layer being immediately subsequent to the first slicing layer;
        determine a thickness of the second slicing layer and an orientation for a third slicing layer of the 3D model based on a difference between the second slicing layer and the first slicing layer, the third slicing layer being immediately subsequent to the second slicing layer; and
        determine a print head trajectory, wherein said determine the print head trajectory comprises control an orientation for a print head for printing along a contour of the first slicing layer, the second slicing layer or the third slicing layer.

12. The system according to claim 11, wherein the difference is based on an area of the second slicing layer and an area of the first slicing layer, and the thickness of the second slicing layer is determined based on the difference between the area of the second slicing layer and the area of the first slicing layer.

13. The system according to claim 11, wherein the orientation for the third slicing layer is determined based on the second slicing layer having the determined thickness.

14. The system according to claim 13, wherein said determine the orientation for the third slicing layer comprises:
    determining a contour of the second slicing layer having the determined thickness based on an intersection between a slicing plane of the second slicing layer having the determined thickness and the 3D model;
    determining a centroid of the contour; and
    determining the orientation for the third slicing layer based on the centroid of the contour.

15. The system according to claim 14, wherein said determine the contour comprises:
- determining a set of intersection points based on the intersection between the slicing plane of the second slicing layer having the determined thickness and the 3D model; and
- determining the contour based on the set of intersection points.

16. The system according to claim 15, wherein
said determine the set of intersection points comprises removing each surface section of the 3D model that has all its vertices below the slicing plane of the second slicing layer having the determined thickness with respect to a coordinate system, and
said determine the orientation for the third slicing layer further comprises determining an area of the contour based on the set of intersection points, and wherein the centroid of the contour is determined based on the area of the contour determined.

17. The system according to claim 11, wherein said determine the thickness of the second slicing layer and the orientation for the third slicing layer comprises determining the thickness of the second slicing layer and the orientation for the third slicing layer iteratively, wherein for each iteration, the thickness of the second slicing layer and the orientation of the third slicing layer are re-determined based on a difference between the second slicing layer with the thickness as determined at the immediately preceding iteration and the first slicing layer.

18. The system according to claim 15, wherein the 3D model is a 3D mesh model, and the at least one processor is further configured to:
- determine, for each intersection point in the set of intersection points, an orientation for the print head for printing at the intersection point based on an intersection between a radial plane and a contour of the third slicing layer, the radial plane including the intersection point and is normal to the slicing plane of the second slicing layer.

19. The system according to claim 15, wherein the at least one processor is further configured to:
- obtain a parametric surface model of the 3D object; and
- determine, for each intersection point in the set of intersection points, an orientation for the print head for printing at the intersection point based on a projected point on the parametric surface model from the intersection point, the projected point being a point on the parametric surface model nearest to the intersection point.

20. A computer program product, embodied in one or more non-transitory computer-readable storage mediums, comprising instructions executable by at least one processor to perform a method of additive manufacturing, the method comprising:
- determining a first slicing layer of a three-dimensional (3D) model of a 3D object;
- determining a second slicing layer of the 3D model based on the first slicing layer, the second slicing layer being immediately subsequent to the first slicing layer;
- determining a thickness of the second slicing layer and an orientation for a third slicing layer of the 3D model based on a difference between the second slicing layer and the first slicing layer, the third slicing layer being immediately subsequent to the second slicing layer; and
- determining a print head trajectory, wherein said determining the print head trajectory comprises controlling an orientation for a print head for printing along a contour of the first slicing layer, the second slicing layer or the third slicing layer.

\* \* \* \* \*